(12) United States Patent
Jordan

(10) Patent No.: US 6,562,251 B1
(45) Date of Patent: May 13, 2003

(54) CHEMICAL-MECHANICAL CONTOURING (CMC) METHOD FOR FORMING A CONTOURED SURFACE USING A STAIR-STEP ETCH

(75) Inventor: Steven G. Jordan, Fremont, CA (US)

(73) Assignee: AIWA Co., Ltd., Tokyo (JP)

( * ) Notice: Subject to any disclaimer, the term of this patent is extended or adjusted under 35 U.S.C. 154(b) by 236 days.

(21) Appl. No.: 09/625,798

(22) Filed: Jul. 26, 2000

(51) Int. Cl.[7] .................................. G11B 5/127

(52) U.S. Cl. .................. 216/22; 216/52; 216/57; 29/603.01; 29/603.15; 29/603.16

(58) Field of Search ................ 216/11, 22, 52, 216/57, 66, 75, 100; 29/603.07, 603.15, 603.16

(56) References Cited

U.S. PATENT DOCUMENTS

| | | | |
|---|---|---|---|
| 5,302,233 A | | 4/1994 | Kim et al. ............... 156/636 |
| 5,617,273 A | | 4/1997 | Carr et al. ............... 360/105 |
| 5,684,660 A | | 11/1997 | Gray et al. .............. 360/126 |
| 5,793,579 A | * | 8/1998 | Yamamoto et al. ........ 360/126 |
| 5,940,956 A | * | 8/1999 | Jordan .................. 29/603.01 |
| 6,407,885 B1 | * | 6/2002 | Ahagon et al. ........... 360/126 |

* cited by examiner

Primary Examiner—Allan Olsen
(74) Attorney, Agent, or Firm—Oblon, Spivak, McClelland, Maier & Neustadt, P.C.

(57) ABSTRACT

A process of chemical-mechanical contouring (CMC) using a stair-step etch involves formation of an elevated layer of substrate overlying a device, in the illustrative example a thin-film magnetic head. The elevated layer of substrate is formed into a stair-step structure with the height and width of the stair-steps selected to attain a predetermined shape and size.

13 Claims, 14 Drawing Sheets

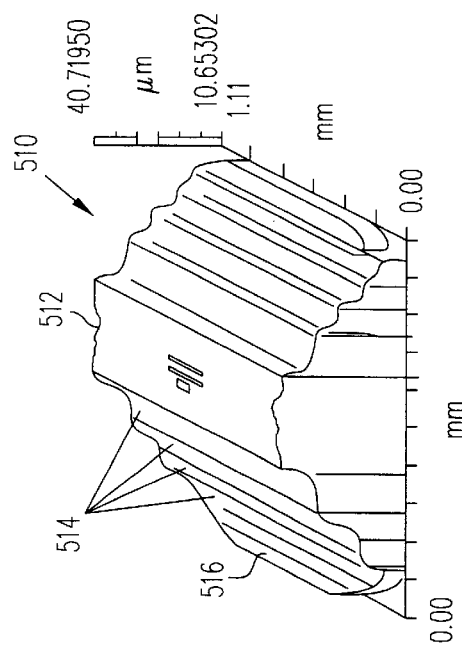
FIG. 5Aii
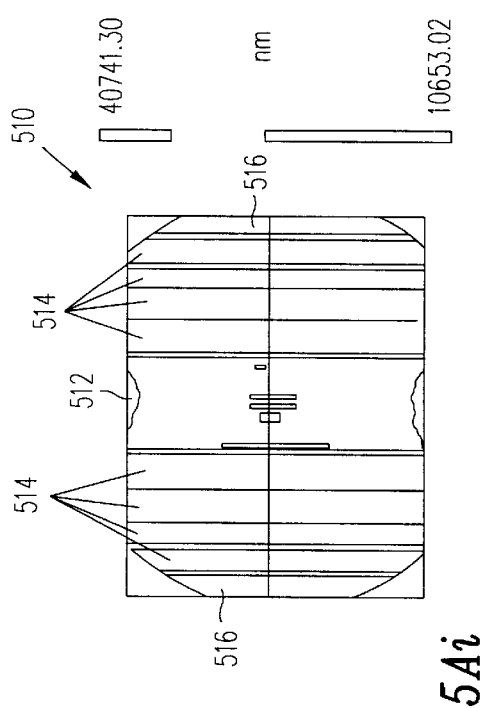
FIG. 5Ai
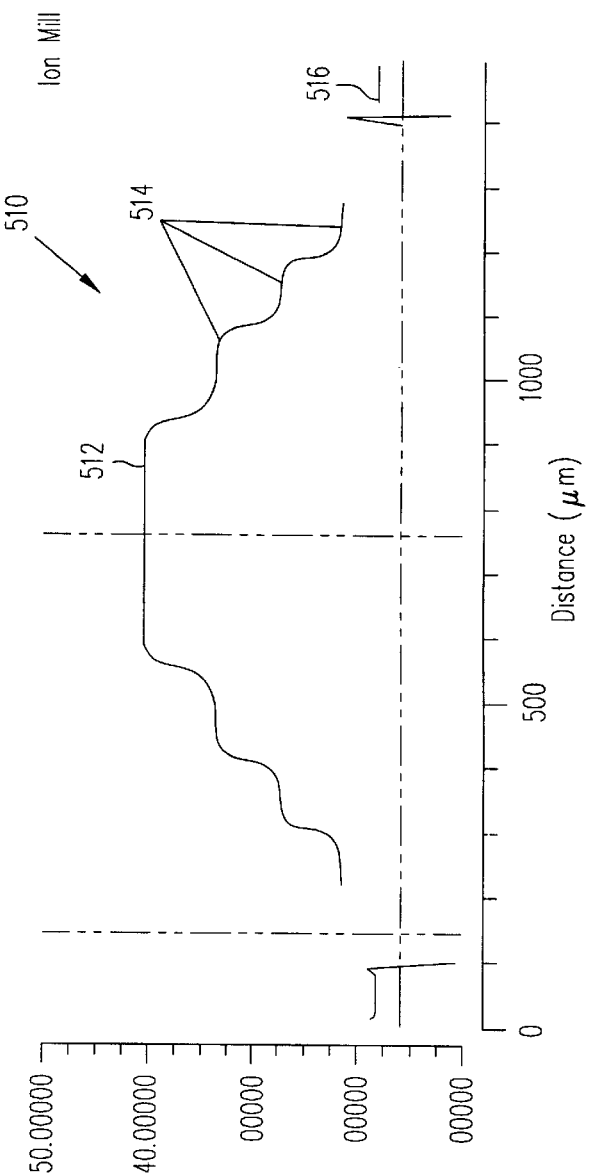
FIG. 5Aiii

FIG. 5Bii

FIG. 5Biii

FIG. 5Cii

FIG. 5Ciii

FIG. 6Aii

FIG. 6Aiii

FIG. 6Bii

FIG. 6Biii

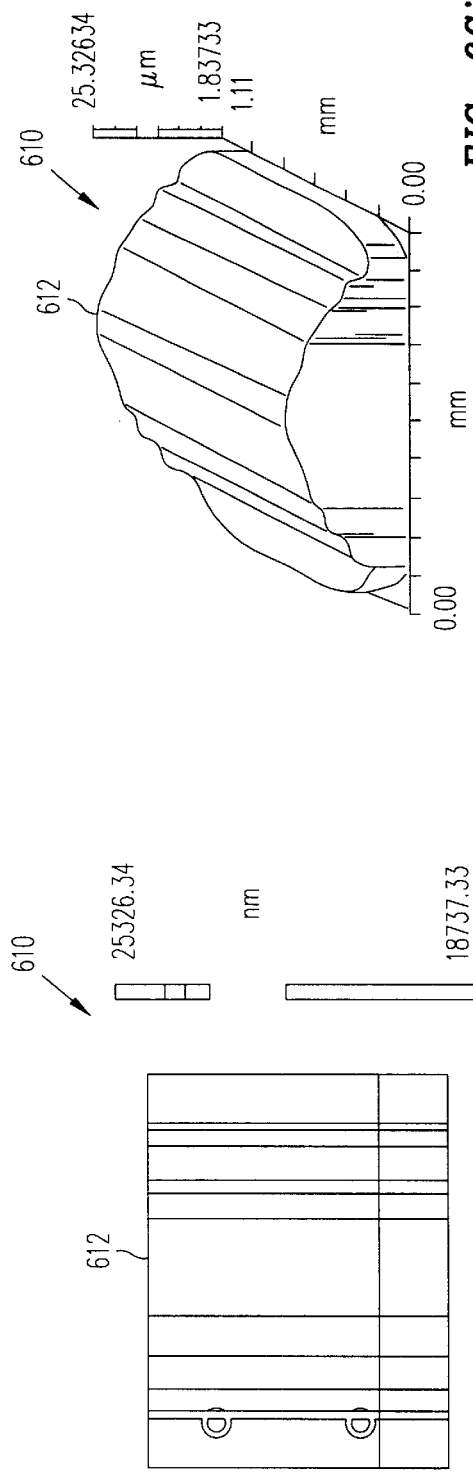
FIG. 6Cii
FIG. 6Ci
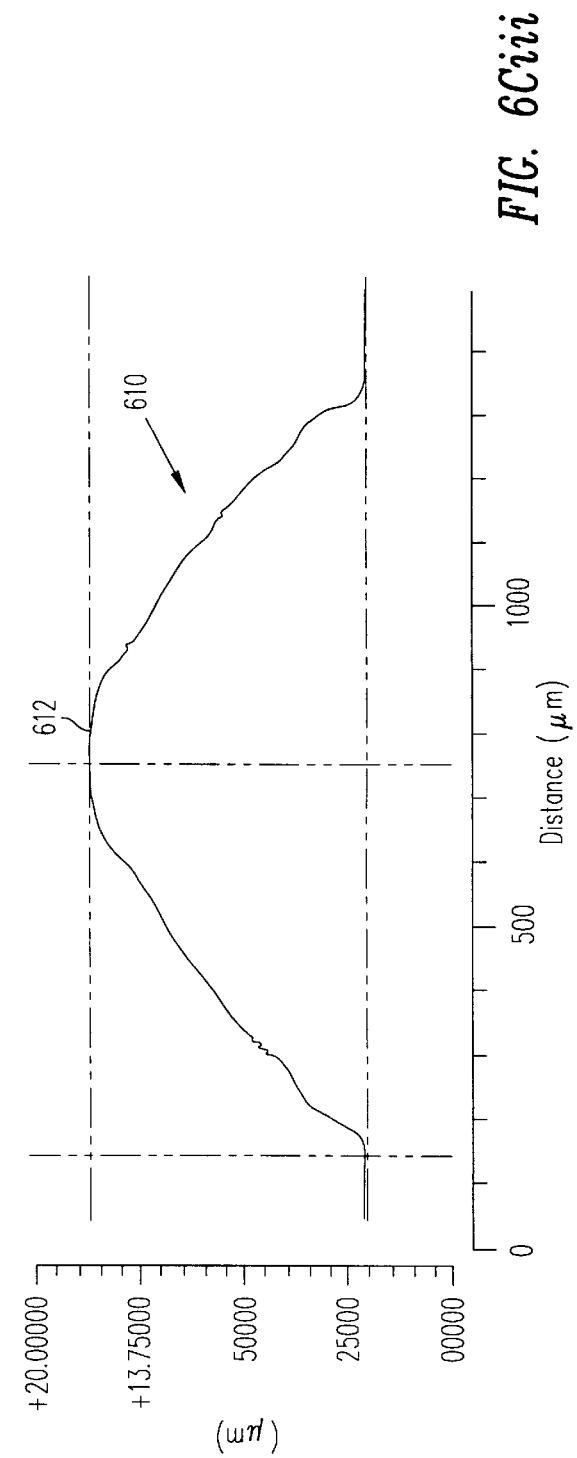
FIG. 6Ciii

CHEMICAL-MECHANICAL CONTOURING (CMC) METHOD FOR FORMING A CONTOURED SURFACE USING A STAIR-STEP ETCH

BACKGROUND OF THE INVENTION

Chemical-mechanical polishing (CMP) is a known technique for planarizing various structures on a thin film substrate. CMP is conventionally used to create a smooth, planar surface for intermediate processing steps of a thin film fabrication process. Specifically, various layers such as metallization layers are deposited and etched during the fabrication of thin film devices on a substrate. The layers are commonly subjected to CMP so that planar deposition of additional layers is achieved. CMP processing not only is used to planarize protruding surfaces, but also to remove undesirable residues that remain from other substrate processing steps.

CMP involves simultaneous chemically etching and mechanical polishing or grinding of a surface so that a combined chemical reaction and mechanical polishing removes a desired material from the substrate surface in a controlled manner. The resulting structure is a planarized substrate surface with the protruding surface topography leveled. CMP is typically performed by polishing a substrate surface against a polishing pad that is wetted with a slurry including an acidic or basic solution, an abrasive agent and a suspension fluid.

Thin film magnetic heads, which are constructed using advanced integrated circuit processing techniques, have been developed to improve performance of high density magnetic recording while reducing fabrication cost. Thin film magnetic heads are typically constructed using multiple substrate processing steps, including steps of deposition, etching and planarization of multiple insulative, conductive and magnetic layers. In a typical conventional thin film magnetic head fabrication process, on the order of thousands of thin film heads are formed on a six inch substrate. The substrate is subsequently diced into a large number, typically thousands, of individual thin-film heads. Each head is mounted individually, one-by-one on a head mounting block. Each mounted head is subjected to a lapping or grinding process to planarize each head, resulting in a planar, rectangular parallelepiped structure. Lapping is a method of reducing the thickness of a substrate slice for applications in which accuracy of the substrate thickness is important to the operation of the device. After lapping processing, a slurry of water and fine grit is used to wear down the back of the slice. The slurry is placed between a flat plate and the back of the slice and the slice is moved with respect to the plate to mechanically remove the substrate material.

The individual lapping of each thin film magnetic head, one-by-one, is tremendously time consuming, greatly raising the cost of each thin film head and the cost of a recording and playback apparatus using thin film heads. For example, a typical wafer may contain sixteen thousand devices. The layer to be ground is typically only a few microns thick requiring a skilled artisan using a high degree of care to successfully grind the devices. Therefore, waste is common and grinding time for planarization a single device is often in the range of ten minutes so that grinding even a single wafer using a single grinder is clearly impractical. Furthermore, each grinder costs in the range of several hundred thousand dollars so that cutting a single wafer into multiple sections and grinding the sections on separate grinders does not improve the practicality of planarizing the devices by grinding. In addition, wheels for a grinder are expensive diamond wheels that cost approximately $3000 each and, although somewhat durable, do wear with repeated grindings.

These considerations indicate the high cost and time consuming nature of planarization via grinding.

In some processes, the thousands of thin film heads are constructed using multiple processing steps, similar to the processing steps of integrated circuit manufacture. The substrate is then sliced into rows to produce strips typically holding ten to sixteen devices. A row tool is the used, applying a rocking or lapping motion to planarize the multiple heads in a row, resulting in the planar, rectangular parallelepiped structure. The procedure of slicing the substrate into rows greatly improves processing as compared to the alternative of processing each head individually. One disadvantage of this procedure is that the step of slicing the substrate into rows for lapping using a row tool is an extra step that increases manufacturing time and costs.

A further disadvantage of the conventional thin film magnetic head having a planar, rectangular parallelepiped structure is that, despite time consuming and expensive planarization processing, the planar structure does not furnish an optimum contact of the magnetic tape media.

What is needed is a thin film magnetic head planarization technique that avoids planarization of each head individually. What is further needed is a thin film magnetic head fabrication technique that produces a thin film magnetic head having an improved tape contact.

SUMMARY OF THE INVENTION

A process of chemical-mechanical contouring (CMC) using a stair-step etch involves formation of an elevated layer of substrate overlying a device, in the illustrative example a thin-film magnetic head. The elevated layer of substrate is formed into a stair-step structure with the height and width of the stair-steps selected to attain a predetermined shape and size.

In accordance with one aspect of the present invention, an apparatus includes a substrate, and a wear surface coupled to the substrate. The wear surface has a form of a bump. The bump has a radius of curvature controlled to within 0.5 mm.

In accordance with another aspect of the invention, a thin film magnetic head structure includes a substrate having a planar surface and a plurality of magnetic heads laterally distributed on the planar surface of the substrate. The individual magnetic heads include a plurality of magnetic poles and have a head form that is raised relative to the planar surface of the substrate. The planar surface transitions to the raised head having a radius of curvature controlled to within 0.5 mm. The thin film magnetic head structure further includes an insulator layer formed generally overlying and extending lateral to the magnetic poles on the surface of the substrate, and a dielectric layer formed generally overlying the insulator layer and the magnetic poles overlying the surface of the substrate. The dielectric layer is formed into a smooth, defined shape with substantial uniformity so that radius of curvature is controlled to a defined tolerance among the plurality of magnetic heads.

In accordance with a further aspect of the invention, an apparatus includes a finished thin film substrate including a plurality of magnetic thin-film head devices and a substantially smooth, curved surface overlying ones of the plurality of magnetic thin-film head devices. The magnetic thin-film head devices have a head structure that is raised relative to a planar surface of the thin film substrate. The planar surface transitions to the raised head having a radius of curvature controlled to within 0.5 mm. The surface of the devices has a defined shape with substantial uniformity so that radius of curvature is controlled to a defined tolerance. The apparatus further includes a magnetic pole and a hard frame in the magnetic thin-film head devices. The magnetic pole and the hard frame extend to the thin film substrate planar surface. The substantially smooth, curved surface overlying the plurality of magnetic thin-film head devices is stair-step etched and chemical-mechanically contoured using a slurry including an oxygen-rich etchant and a solid abrasive material. The slurry being positively selective of the hard frame in comparison to the magnetic pole.

In accordance with another aspect of the invention, an article of manufacture includes a finished thin film substrate including a plurality of thin film magnetic heads, and a substantially smooth, curved surface overlying ones of the plurality of thin film magnetic heads. The magnetic thin-film heads are raised relative to a planar surface of the thin film substrate. The planar surface transitions to the raised head having a radius of curvature controlled to within 0.5 mm. The smooth, curved surface is at least partly formed of a dielectric layer and is uniform on the substrate so that the surface of the devices have a defined shape with substantial uniformity so that radius of curvature is controlled to a defined tolerance.

In accordance with a further aspect of the invention, a thin film processing method includes fabricating a finished thin film substrate including a plurality of magnetic thin-film head devices, and stair-step etching the head structure. The resulting individual thin-film head devices have the form of raised bumps with a plurality of stair-step edges. The magnetic thin-film head devices having a head structure that is raised relative to a planar surface of the thin film substrate. The method further includes chemical mechanical contouring (CMC) the thin film substrate subsequent to the fabrication step to smooth the stair-step edges of the raised bumps to form substantially smooth, curved surfaces.

In accordance with a still further aspect of the invention, a thin film processing method includes fabricating a finished thin film substrate including a plurality of thin film magnetic heads, stair-step etching the insulating frame of the individual thin-film heads, and chemical-mechanical contouring the heads. The magnetic thin-film heads are raised relative to a planar surface of the thin film substrate. The raised thin-film heads include a magnetic yoke, and a coil encircling the magnetic yoke. Magnetic poles are coupled at polar ends of the magnetic yoke and separated by a gap. An insulating frame encases and mutually insulates the magnetic yoke and the coil. The magnetic yoke and coil are centrally located within an individual thin-film head. Stair-step etching of the insulating frame results in the centrally located magnetic yoke and coil underlying a raised portion of the insulating frame. Portions of the individual thin-film heads lateral to the magnetic yoke and coil are etched to form depressions between the individual thin-film heads. Chemical mechanical contouring (CMC) of the thin film substrate subsequent to the fabrication step forms a substantially smooth, curved surface overlying the individual thin film magnetic heads.

BRIEF DESCRIPTION OF THE DRAWINGS

The features of the described embodiments believed to be novel are specifically set forth in the appended claims.

However, embodiments of the invention relating to both structure and method of operation, may best be understood by referring to the following description and accompanying drawings.

DETAILED DESCRIPTION OF THE ILLUSTRATIVE EMBODIMENTS

Figure 1:
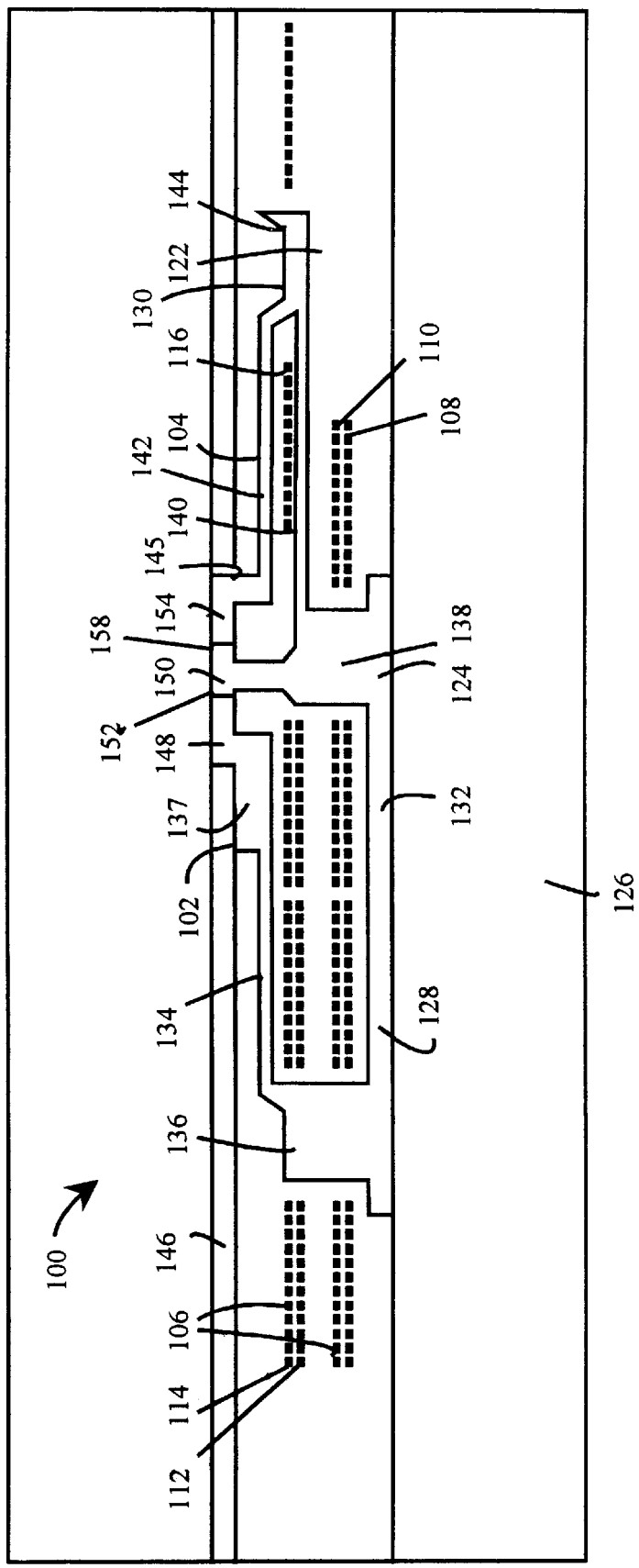
FIG. 1 is a cross sectional view of a multiple-gap thin film magnetic head having two planar heads including a read head and a write head in accordance with an embodiment of the present invention.

Referring to FIG. 1, a cross sectional view of a multiple-gap thin film magnetic head 100 having two planar heads including a read head 102 and a write head 104. The usage of separate magnetic heads for reading and writing a media, and in some embodiments for erasing a media, is advantageous in applications including stationary-head and moving-head applications. The read head 102 has four layers of read magnetic coil 106 including a first layer dual pancake coil 108, a second layer dual pancake coil 110, a third layer single pancake coil 112, and a fourth layer single pancake coil 114. A pancake coil is a coil in the shape of a planar spiral that wraps around a magnetic pole. The first layer dual pancake coil 108 and the second layer dual pancake coil 110 have a split or dual pancake coil structure. In an illustrative embodiment, each of the first layer dual pancake coil 108 and the second layer dual pancake coil 110 has a resistance of approximately 30 ohms per layer and has 30 turns with each of the dual pancake coils having 15 turns. The third layer single pancake coil 112 and the fourth layer single pancake coil 114 have a single pancake coil structure. In the illustrative embodiment, each of the third layer single pancake coil 112 and the fourth layer single pancake coil 114 has a resistance of approximately 38 ohms per layer and has 30 turns. The illustrative read magnetic coil 106 includes a total of 120 turns and has a total estimated resistance of 136 ohms.

The write head 104 has a single layer write magnetic coil 116 that, in the illustrative embodiment, is a 20-turn pancake coil with a center tap.

The read coil 106 and the single layer write coil 116 are formed using conventional thin-film fabrication techniques.

In one example, the read coil 106 and write coil 116 are formed by sputtering a seed layer (not shown) on an insulative body 122 to form a plating base, depositing and patterning a photoresist layer (not shown) on the seed layer, then plating a metal coil layer in the open regions of the seed layer. In an illustrative embodiment, chromium copper (CrCu) is sputtered onto the insulative body 122 to serve as the seed layer and copper is plated onto the seed layer to form a metal coil. The insulative body 122 is any suitable insulating material. In an exemplary structure, the insulative body 122 is formed from sputtered aluminum oxide.

The read coil 106 and the single layer write coil 116 are formed within the framework of a magnetic yoke 124 which forms a magnetic core. Coils of the read magnetic coil 106 and single layer write magnetic coil 116 are mutually insulated and insulated from the magnetic yoke 124 by the insulative body 122. The insulative body 122 is formed in several layers overlying the substrate 126. In an illustrative embodiment, various layers of the insulative body 122 are formed by sputter depositing a layer of aluminum oxide over the magnetic coil or magnetic core, and chemical-mechanical polishing (CMP) the aluminum oxide layer to expose the magnetic coil or magnetic core interconnects. Additional layers are formed overlying the aluminum oxide layer.

Figure 2:
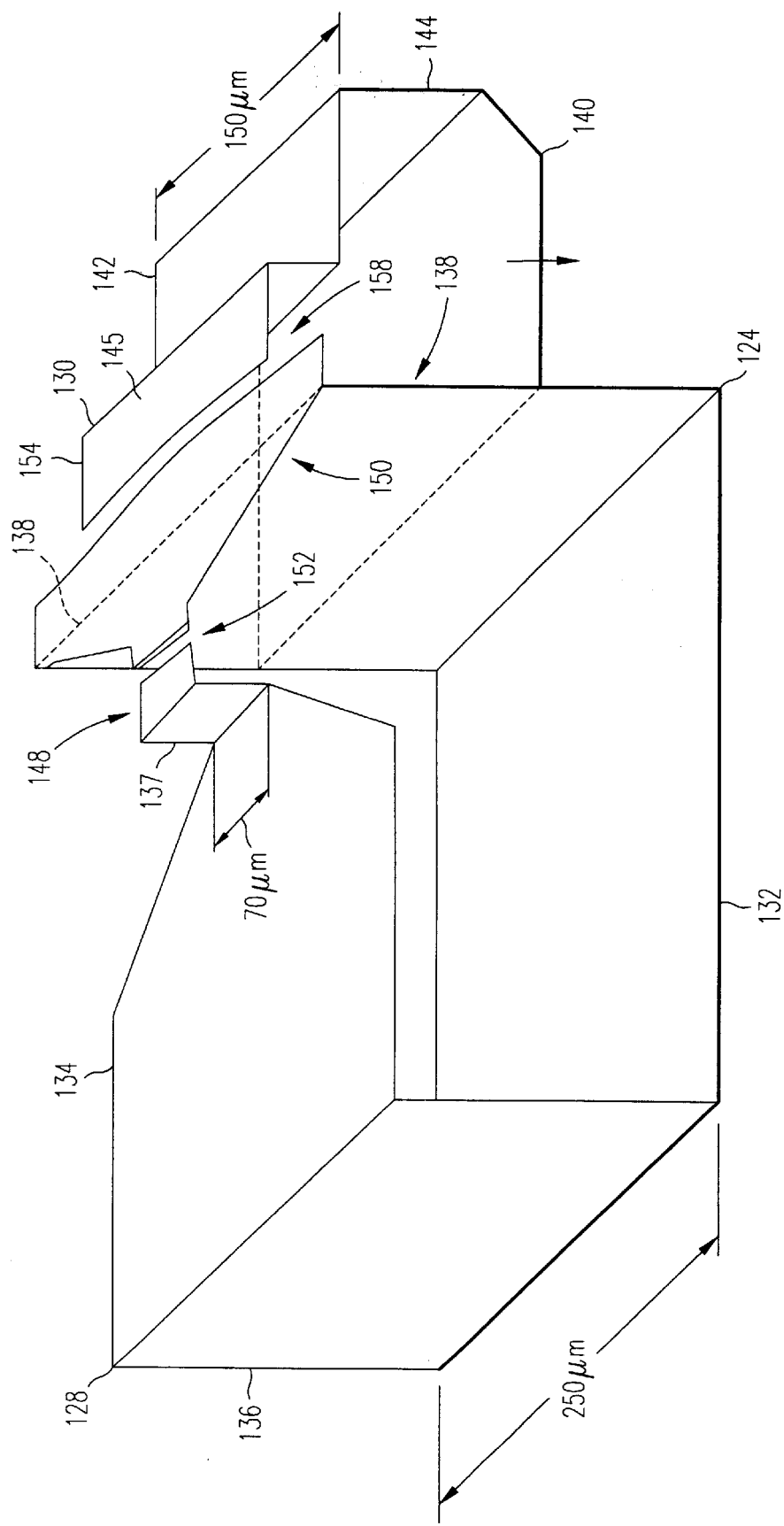
FIG. 2 is a perspective three dimensional view showing an embodiment of a magnetic core or yoke, the three dimensional view is useful in combination with FIG. 1 for illustrating the combined structure of a magnetic yoke, a read magnetic coil, and a write magnetic coil.
Figure 3:
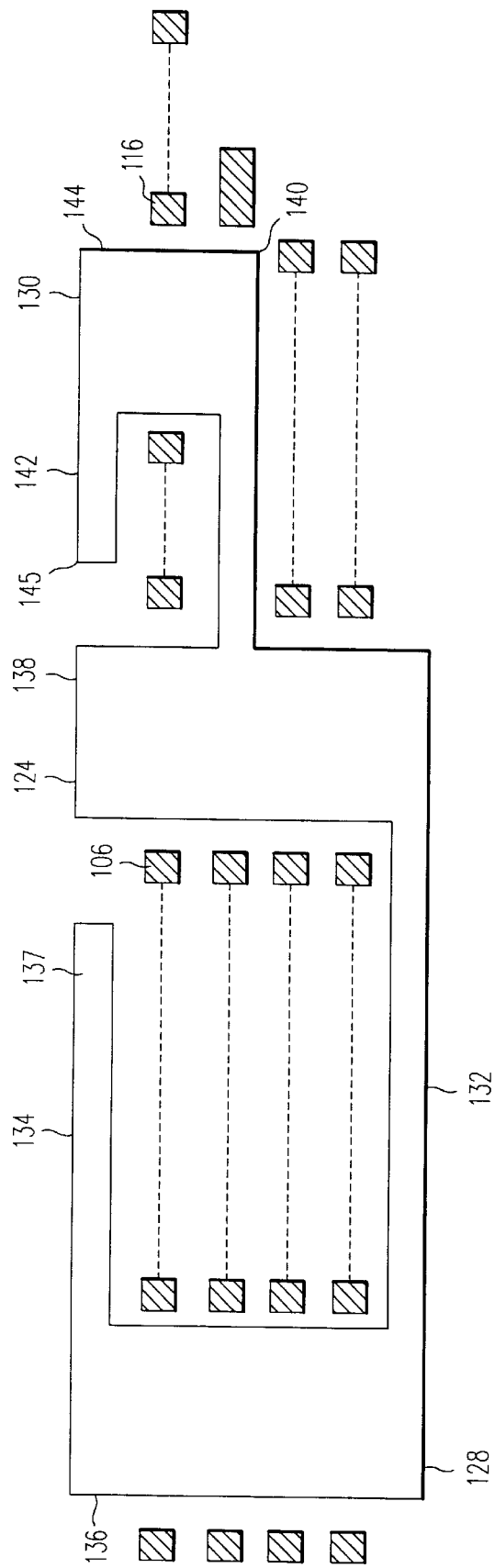
FIG. 3 is a cross sectional view showing an embodiment of the magnetic core or yoke shown in FIG. 2 illustrating the combined structure of a magnetic yoke, a read magnetic coil, and a write magnetic coil.

FIG. 2 depicts a perspective three dimensional view of the magnetic yoke 124 and FIG. 3 shows a cross sectional view of the magnetic yoke 124 which are useful in combination with FIG. 1 for illustrating the combined structure of the magnetic yoke 124, the read coil 106, and the single layer write coil 116. The magnetic yoke 124 is formed using an electroplating technique. In one embodiment, the magnetic yoke 124 is formed by depositing and patterning a photoresist layer (not shown) onto the substrate 126, sputtering a seed layer (not shown) onto the substrate 126, and stripping the photoresist to lift off the seed layer in areas that are covered by the photoresist, then electroplating a magnetic material such as nickel-iron (NiFe) onto the seed layer. Sputtering chromium-nickel vanadium (Cr—NiV) onto the substrate 126 forms a suitable seed layer.

The magnetic yoke 124 (magnetic core) includes a read magnetic yoke 128 (read core) and a write magnetic yoke 130 (write core). The read magnetic yoke 128 includes a bottom read yoke piece 132, a top read yoke piece 134, and a multiple-pole structure including a read side pole 136, a read pole 137, and a central pole 138. The top pole includes a read magnetic side pole 148, a center magnetic side pole 150, and a write magnetic side pole 154 that are mutually separated by gap fill layers 147 formed from a wear-resistant material such as diamond-like carbon (DLC). The read magnetic side pole 148, center magnetic side pole 150, and write magnetic side pole 154 are laterally enclosed by a protective layer 146 that is formed of a hard dielectric material such as aluminum oxide or DLC. The write magnetic yoke 130 includes a bottom write yoke piece 140, a top write yoke piece 142, a write side pole 144, a write yoke pole 145, and the central pole 138. The central pole 138 is shared by and forms a boundary between the read magnetic yoke 128 and the write magnetic yoke 130. The central pole 138 has a general form of a rectangular plate that extends generally perpendicular to the illustrative horizontal planar surface of the substrate 126. The bottom read yoke piece 132 extends from the lower end of the central pole 138 in a horizontal plane that is parallel to the horizontal planar surface of the substrate 126. The read side pole 136 extends generally vertically from the bottom read yoke piece 132 above the substrate 126. The top read yoke piece 134 extends generally horizontally from the top of the read side pole 136 toward the central pole 138. The bottom read yoke piece 132 is longer than the top read yoke piece 134 so that the read magnetic yoke 128 has a gap between the top read yoke piece 134 and the central pole 138. The read yoke pole 137 extends generally vertically upward from the end of the top read yoke piece 134 that is nearest to the central pole 138 so that the read side pole 148 has a clearance from the top read yoke piece 134.

The bottom write yoke piece 140 extends from the central pole 138 at a medial vertical position of the central pole 138 in a horizontal plane that is parallel to the horizontal planar surface of the substrate 126. The bottom write yoke piece 140 extends from the central pole 138 in a direction opposite the read magnetic yoke 128. The write side pole 144 extends generally vertically from the bottom write yoke piece 140 above the substrate 126. The top write yoke piece 142 extends generally horizontally from the top of the write side pole 144 toward the central pole 138. The bottom write yoke piece 140 is longer than the top write yoke piece 142 so that the write magnetic yoke 130 has a gap between the top write yoke piece 142 and the central pole 138. The write yoke pole 145 extends generally vertically upward from the end of the top write yoke piece 142 that is nearest to the central pole 138. In the illustrative example, the central pole 138 has a length that is equal to the length of the read side pole 136. The vertical position of the bottom write yoke piece 140 along the central pole 138, the length of the write side pole 144, and the length of the write yoke pole 145 are selected so that the top of the write yoke pole 145, the top of the central pole 138, and the top of the read yoke pole 137 are vertically aligned.

Referring again to FIG. 1, the read pole 137, write yoke pole 145, and upper end layers of the central pole 138 are electroplated. Then gap fill layers 147 are formed in a read head gap region 152 overlying the top read yoke piece 134 and formed in a write head gap region 158 overlying the top write yoke piece 142 between the central pole 138 and the read pole 137, between the central pole 138 and the write yoke pole 145. The protective layer 146 is formed overlying the top read yoke piece 134 and the top write yoke piece 142, lateral to the read pole 137 and write yoke pole 145. In the illustrative embodiment, the protective layer 146 is an electrically insulative layer of patterned aluminum oxide that is patterned. In other embodiments, other dielectric materials may be employed such as DLC or an electron-beam cured photoresist. The protective layer 146 typically has a rectangular geometry although other geometries such as circular or elliptical geometries may also be used.

Referring to FIG. 1 and FIG. 2, overlying the read yoke pole 137 and the central pole 138 in a planar horizontal layer including the protective layer 146, the read magnetic side pole pieces 148 and center magnetic side pole 150 extend horizontally between the read yoke pole 137 and the central pole 138. The read magnetic pole pieces 148 and 150 are separated and by a portion of the protective layer 146. Also overlying the read yoke pole 137 and the central pole 138 in a planar horizontal layer including the protective layer 146 are write magnetic side pole pieces 154 which extend horizontally from write yoke pole 145 toward the central pole 138 and are also separated by a portion of the protective layer 146.

Figure 4A:
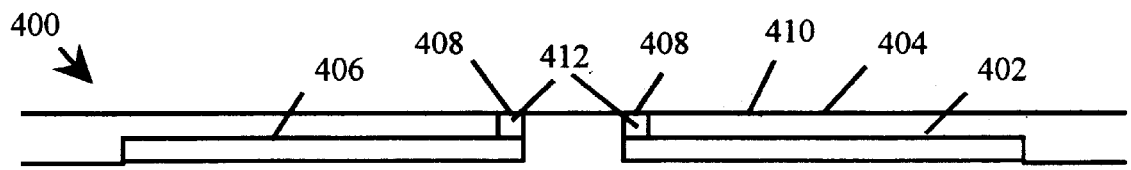
FIGS. 4A through 4O depict a series of cross sectional views of a read-write thin film magnetic head illustrating fabrication steps for forming a contoured surface using a stair-step etch.
Figure 4B:
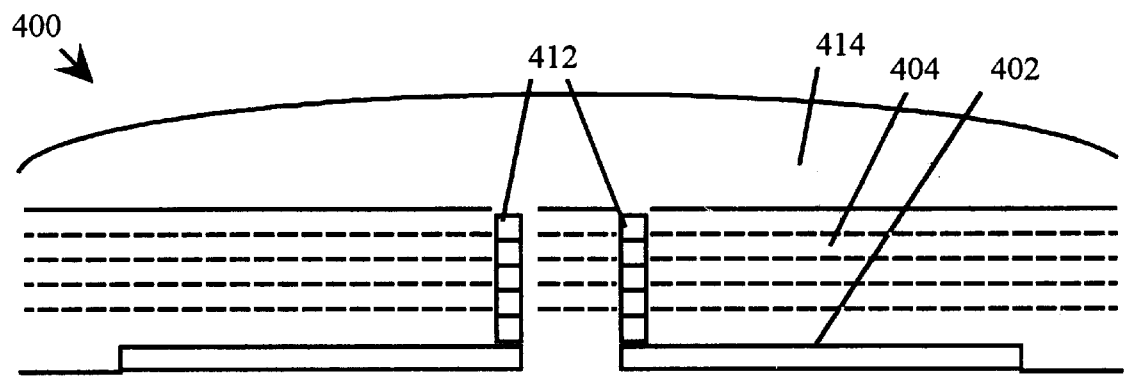
Figure 4C:
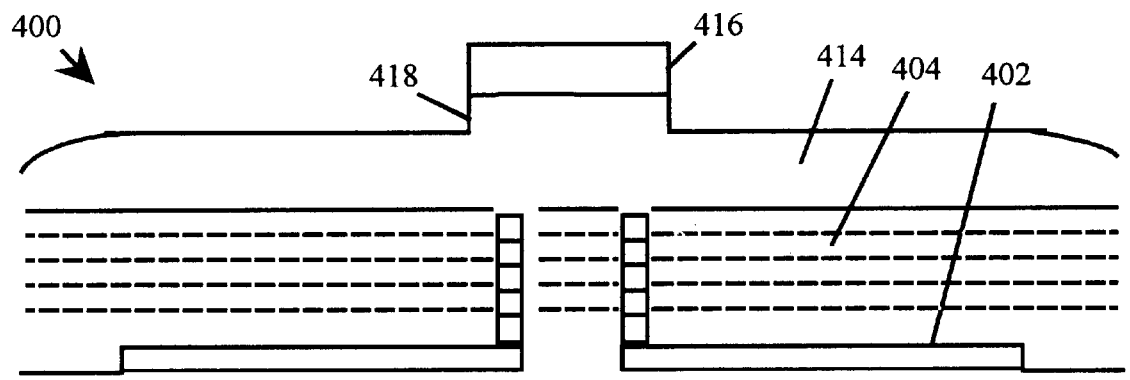
Figure 4D:
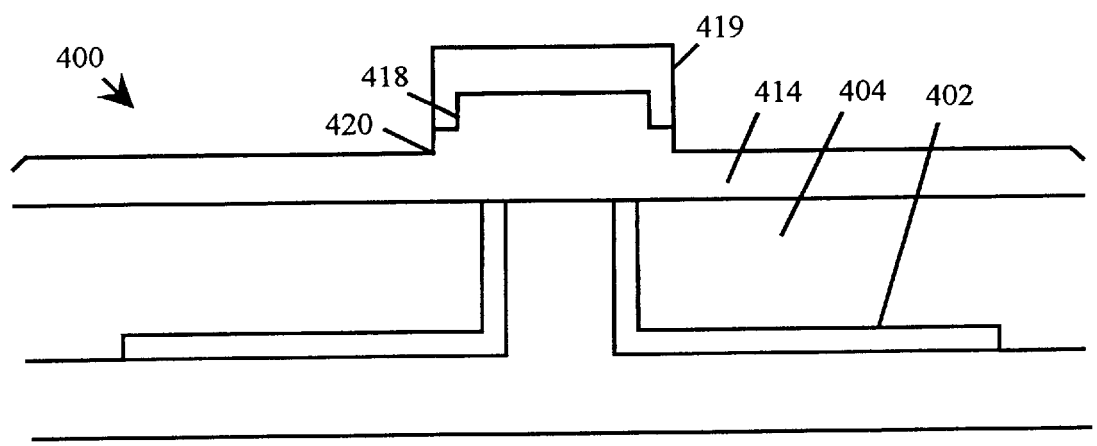
Figure 4E:
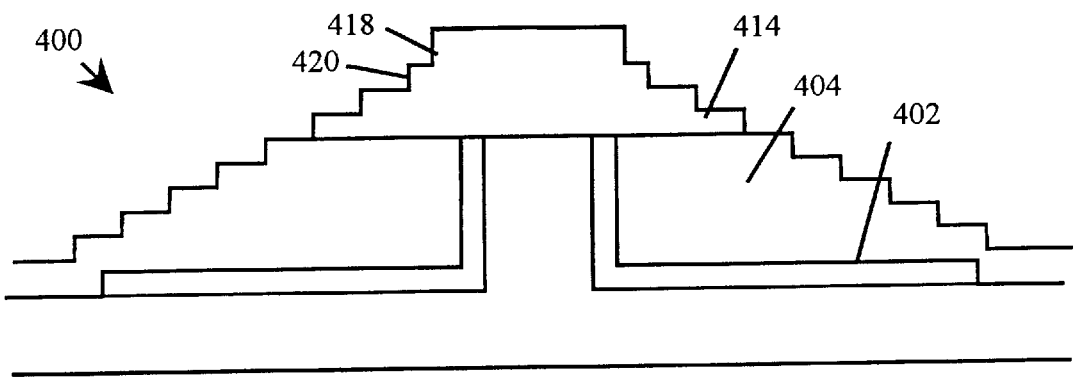
Figure 4F:
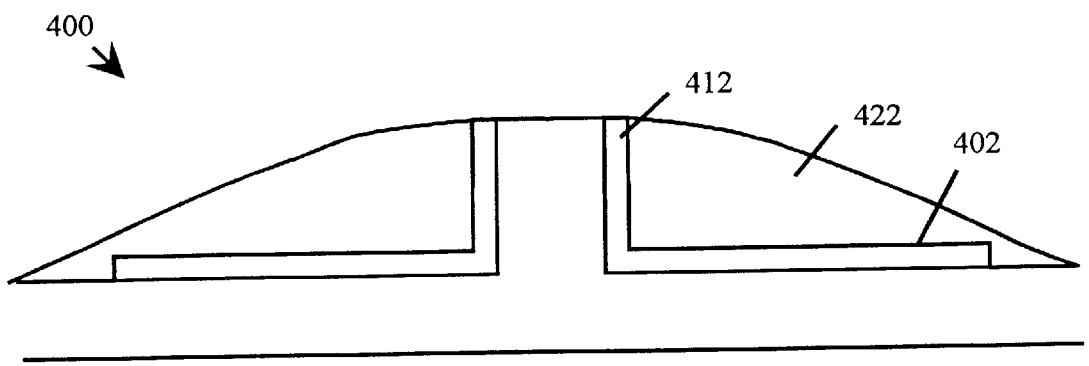
Figure 4G:
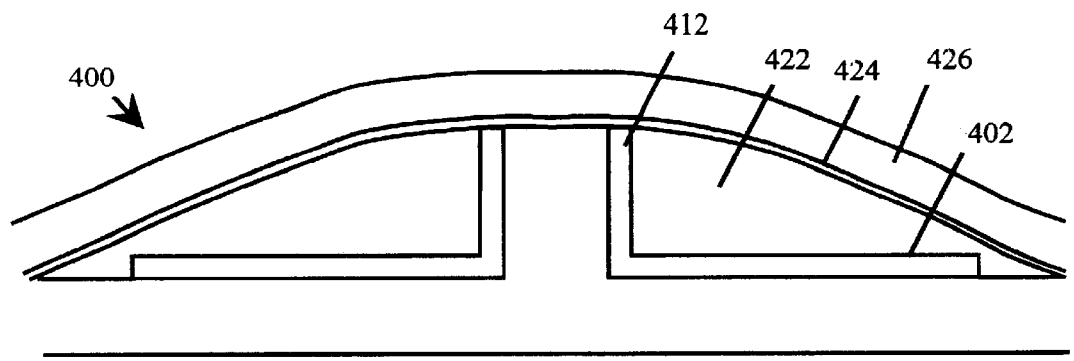
Figure 4H:
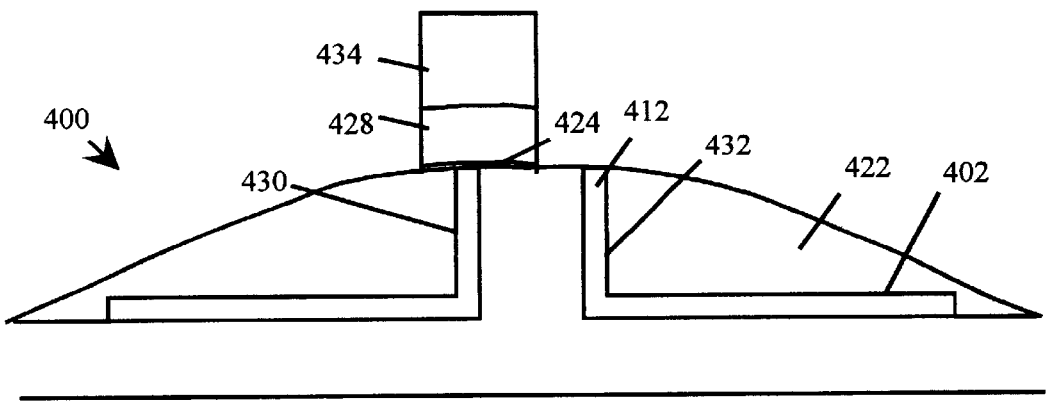
Figure 4I:
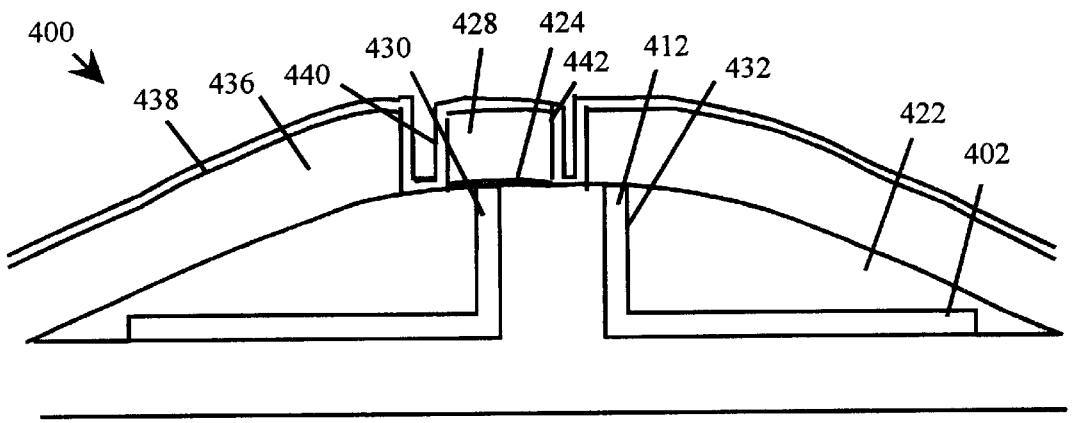
Figure 4J:
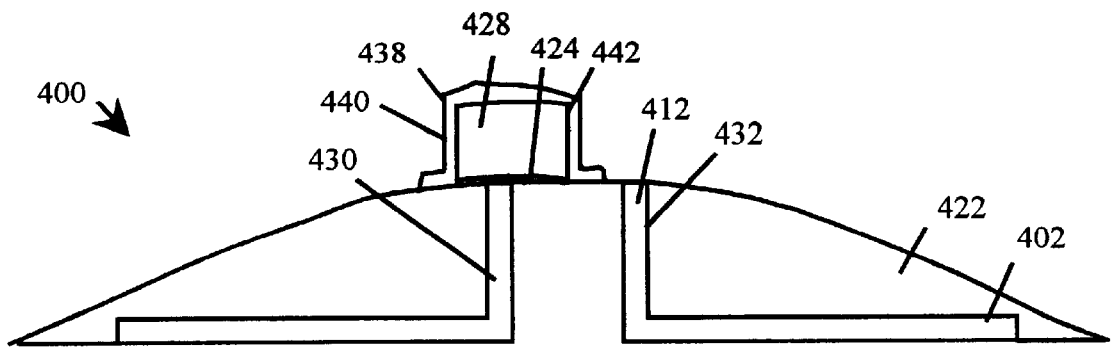
Figure 4K:
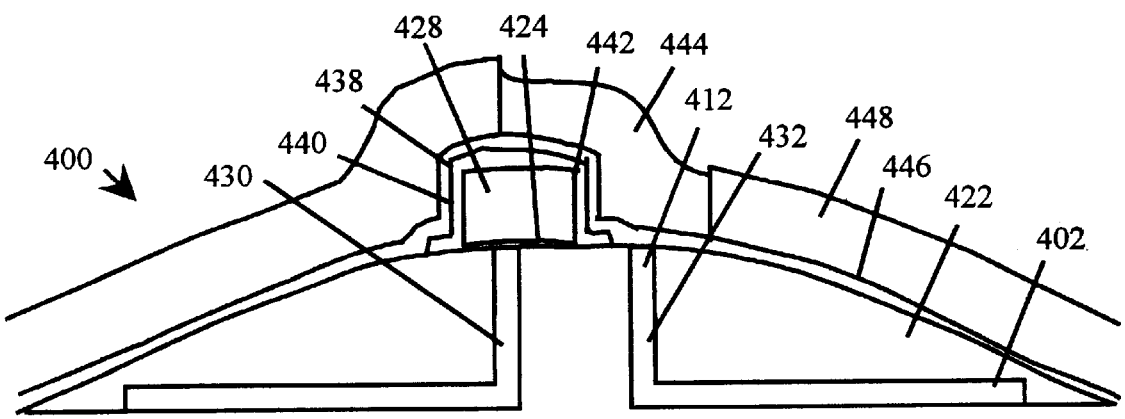
Figure 4L:
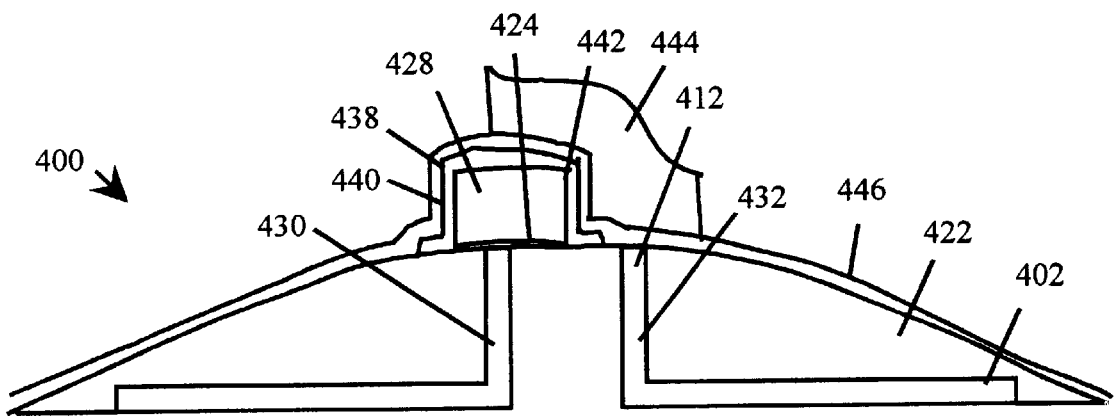
Figure 4M:
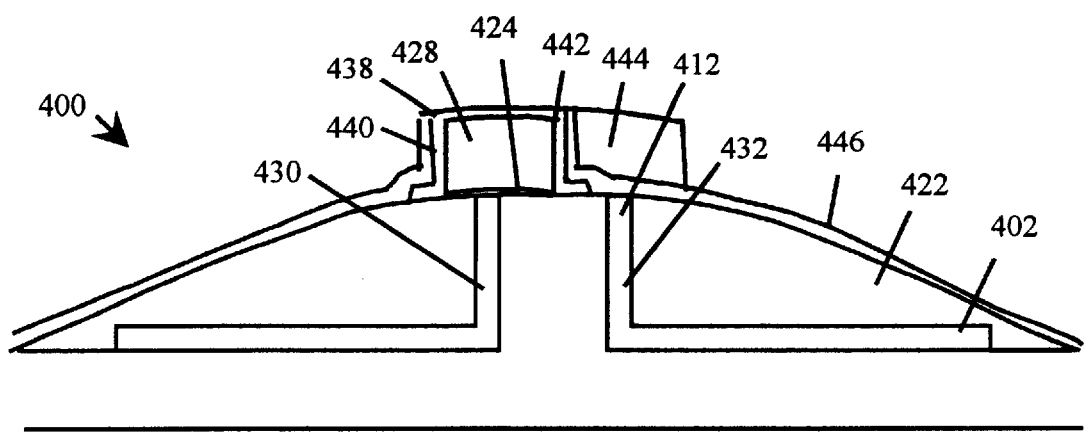
Figure 4N:
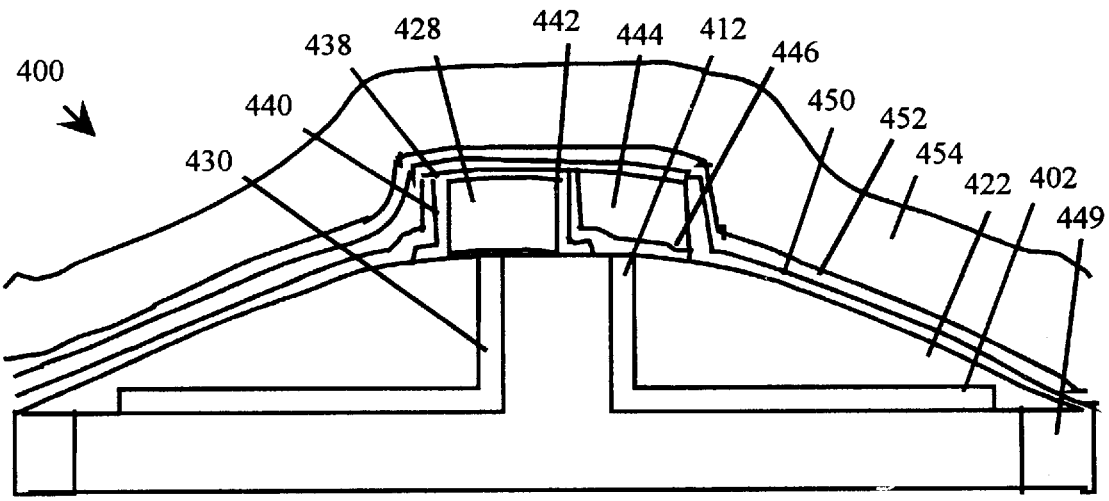
Figure 4O:
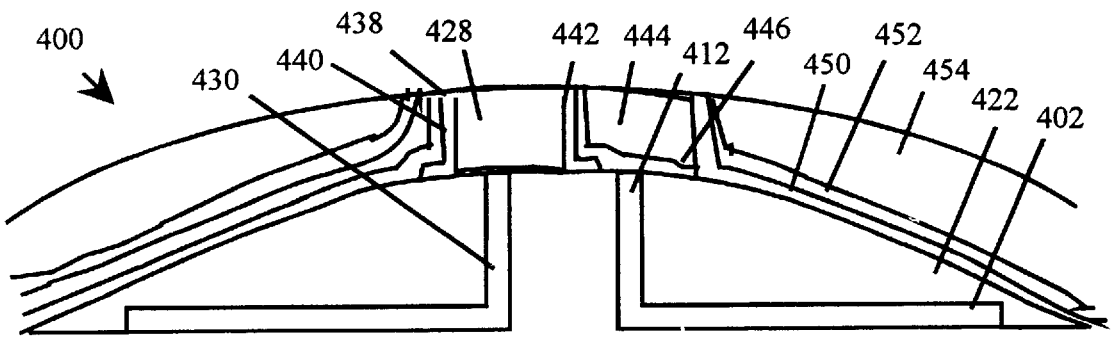

FIGS. 4A through 4O depict a series of cross sectional views of a read-write thin film magnetic head 400 illustrating fabrication steps for forming a read-write gap structure 460. Referring to FIG. 4A, a cross-sectional view illustrates deposition of a magnetic yoke 402 within an insulating layer 404. The magnetic yoke 402 includes a bottom yoke layer 406 that is constructed from a magnetic material, for example NiFe. Alternately, side pole segments 408 and insulating layer segments 410 are formed overlying the bottom yoke layer 406 to form side poles 412. One suitable insulating material for usage in the insulating layer segments 410 is alumina.

FIG. 4B shows the read-write thin-film magnetic head 400 after completion of the side poles 412 of the magnetic yoke 402. The insulating layer 404 is planarized to form a planar surface overlying the magnetic yoke 402. A thick insulating layer 414 is deposited overlying the magnetic yoke 402 and the insulating layer 404.

A step etch operation is performed on the surface of the read-write thin-film magnetic head 400 to form a stair-step structure in the thick insulating layer 414 and the insulating layer 404. The step etch operation includes determining the location of a generally centrally-located point overlying the multiple gap thin-film magnetic head 400 and etching a sequence of stair-steps surrounding the central point. The operation further involves controlling the width and depth of the stair-step etches as a function of distance from the central point. Stair-step etching includes depositing and patterning a first layer of photoresist 416 centrally-aligned over the magnetic yoke 402, followed by a chemical etch that etches the thick insulating layer 414 to a predetermined depth to form a first step 418, shown in FIG. 4C. The photoresist pattern may have any suitable shape on the top two-dimensional surface of the read-write thin-film magnetic head 400. For example, the photoresist may be patterned to form a square, rectangle, polygon, circle, ellipse, or any other shape depending on the shape that is desired for the surface of the read-write thin-film magnetic head 400.

Referring to FIG. 4D, a second step is formed by depositing and etching a second photoresist layer 419 that not only overlies the first photoresist layer 416 but also protects a second step 420 extending lateral to the first step 418.

The process includes several step etch operations with each subsequent photoresist film layer covering a wider area overlying the read-write thin-film magnetic head 400. In the illustration shown in FIG. 4E, nine step operations are applied to construct nine steps. Any suitable number of steps may be formed depending on the characteristics of the final structure that are desired for the read-write thin-film magnetic head 400. Typically both the thick insulating layer 414 and the insulating layer 410 are etched by the etching process. The stair-step etch procedure permits control of formation of the film layer surface by selecting a particular number of steps, the distance between steps, and the depth of the individual etch steps. The stair-step etch procedure is capable of forming a bulge or bump on a surface to a radius of curvature controlled to within 0.5 mm. The procedure allows the radius of curvature to be varied as a function of distance from the center of the bump or bulge. The form of the bulge or bump can be controlled to be laterally symmetric or asymmetric by controlling the size of the steps as a function of location on the planar surface. For example, a circularly symmetric bump can be constructed by maintaining a constant step size around a bump central axis. An elliptically symmetric structure can be formed by selecting a first step size in one direction, selecting a second step size perpendicular to the first step direction and linearly varying the step size when moving in an arc from the first step direction to the second step direction.

Following completion of the stairstep structure, the read-write thin-film magnetic head 400 is chemically-mechanically contoured (CMC) to smooth the stairstep structure, shown in FIG. 4F, removing sharp edges of the stair steps and forming an even, sloped surface. A special CMC process utilizes a soft polishing pad, applying mechanical polishing motion at a slow speed, typically on the order of ⅓ a typical conventional CMP rotational speed, and at a relatively high pressure, typically two to three times a typical conventional CMP applied pressure.

The CMC process can be used to planarize a substantial plurality of thin film magnetic heads simultaneously. A number of the order of thousands of thin film magnetic heads are fabricated simultaneously to substantially reduce fabrication cost.

Chemical-mechanical contouring (CMC) utilizes application of polishing pad in a typically orbital or planetary motion to a stationary thin film substrate. The orbital or planetary motion is applied to the thin film substrate by a lapping surface of the polishing pad to planarize a plurality of structures on a substrate, typically as an intermediate step in thin film processing so that, as layers of a thin film magnetic head structure are deposited and etched, successive layers are selectively planarized. The planarization of intermediate layers is performed to ready the thin film surface for subsequent layer depositions.

CMC processing further involves application of a chemical slurry to the polishing pad and the thin film substrate workpiece to generate a chemical etching while the workpiece is mechanically contoured. The slurry is a mixture of a chemical etchant and an abrasive compound. As the slurry and polishing motion of the polishing pad are applied to the thin film substrate workpiece, the workpiece is lapped by a lapping surface of the polishing pad.

The CMC processing after completion of the read-write thin-film magnetic head 400 but before dicing of the substrate forms a curved, contoured or rounded surface on the substrate for individual thin film magnetic heads of a substantial plurality of heads on a thin film substrate. Magnetic head performance is improved when the edges of the thin film head structure are rounded.

CMC processing that is used to form thin film heads with a curved structure is substantially different from conventional CMP processing that is typically used to planarize surface structures in intermediate steps of integrated circuit fabrication. For example, a conventional CMP processing procedure involves a mechanical polishing using a hard polishing pad applied at a high speed and low pressure, for example a speed of 50 or more revolutions per minute (rpm), corresponding to a linear speed of 25 inches per second (ips), or faster and a pressure of 2 psi or less. A typical speed and pressure of a conventional process is 60 rpm and 1 psi. A hard polishing pad typically has a compressibility of less than about ten or twelve percent. The conventional CMP processing procedure typically uses a slurry with a dry etchant that etches using either chemical or physical reactions between a low pressure plasma and the surface to be etched.

In contrast, the special CMC processing for thin film magnetic head planarization to form curved-shape thin film heads employs a compliant, or soft, polishing pad which develops an advantageous curved shape, thereby improving the head-to-media interface of the magnetic thin-film magnetic head. One example of a soft polishing pad is a Model 205 pad from Rodel Products Corp. of Scottsdate, Ariz. This soft polishing pad is constructed from napped poromeric synthetics and has a compressibility of from 20 to 38 percent. In contrast, a typical hard polishing pad is constructed from polyurethane impregnated polyester felts. The mechanical contouring of the special CMC process also employs a soft polishing pad applied at a relatively low speed and a relatively high pressure to the thin film substrate surface. The softness of the polishing pad is selected to determine the shape and contour of the curved thin film substrate surface, specifically to achieve a rounded surface. The low speed of the special CMC processing is typically on the order of ⅓ the speed of a conventional CMP process. For example, a typical low processing speed is approximately 10 RPM to 40 RPM, corresponding to a linear speed of 5 ips to 20 ips. The relatively high pressure of the special CMC processing is typically on the order of two to three times the pressure of a conventional CMP procedure. For example, a typical high processing pressure is approximately 2 psi to 10 psi. The special CMC processing employs either conventional orbital motion of the polishing pad or a rectilinear motion between the thin film substrate and the polishing pad table. Slurry is heavily applied saturation in the special CMC processing.

The CMC process utilizes a mechanical action, which is generated by movement on a suitable surface, or "lap". The surface of a thin film substrate to be contoured using CMC is substantially saturated with a slurry that contains a chemical etchant and finely graded particles of a hard material such as alumina or diamond-like carbon (DLC). The finely graded particles of finely graded materials operate to remove surface layers from the DLC and enable and enhance reaction of the DLC with the etchant.

The CMC process uses a chemical etchant that is negatively selective of the NiFe or positively selective of the alumina so that the surface of the magnetic side poles 412 remains level, or slightly elevated, with respect to an alumina frame 422 that remains from the insulating layer 404 following CMC processing. An oxygen-rich liquid, such as hydrogen peroxide ($H_2O_2$), preferentially etches alumina. A lapping material that is negatively selective of the NiFe magnetic pole material uses an oxygen-rich etchant, such as hydrogen peroxide ($H_2O_2$), in the CMC process. In other embodiments, other oxygen-rich etchants may be used including HOCl, KOCl, $KMgO_4$, and $CH_3COOH$. The abrasive portion of the slurry includes finely graded particles of a hard material such as alumina or diamond. The oxygen-rich chemical etchant and the abrasive material are mixed in a slurry to form the lapping material. Advantageously, when the thin film magnetic head is lapped using this etchant, the alumina is preferentially etched and the etchant leaves the NiFe side poles 412 relatively undisturbed.

Referring to FIG. 4G, an iron-tantalum-nitride FeTaN coating 426 is formed overlying the alumina frame 422 and side poles 412. A nickel-iron seed layer 424 is first formed overlying the alumina frame 422 and side poles 412 to serve as an adhesive layer that firmly attaches the FeTaN coating 426. The NiFe seed layer 424 is formed sufficiently thick to bond the FeTaN coating 426 but sufficiently thin to avoid giving the FeTaN coating 426 a significant magnetic density. In one example, the NiFe seed layer 424 has a thickness in a range from about 800 Å to approximately 1200 Å. A blanket FeTaN coating 426 layer is grown on the NiFe seed layer 424 using a suitable deposition technique. A common thickness for the blanket FeTaN coating 426 is approximately $5\mu$ depending on the throat height of the read-write thin-film magnetic head 400. A typical range of FeTaN coating 426 thickness is from about $3.5\mu$ to approximately $10\mu$. Although other fabrication operations for forming the FeTaN coating 426 are known by one having ordinary skill in the art, one example utilizes FeTaN deposition in which 10 to 14% tantalum is applied to the head with the remainder iron. The deposition takes place in an argon gas ambient with 8–12% nitrogen added, by volume. Power density applied during deposition ranges from about 2.5 Kwatt to 3.5 Kwatt, and a substrate bias voltage in a range from about 100–150 V at 12–18 mTorr gas pressure. A suitable cooling temperature range is from 4 to 10° C. The described fabrication parameters are presented for example only and not limitation. Any suitable FeTaN deposition parameters may be used. The fabrication parameters are tuned to control corrosivity, for example to attain a high magnetic saturation ($B_{sat}$) and low corrosivity. Upon deposition, the FeTaN coating 426 is not magnetic.

The FeTaN coating 426 is made magnetic by thermal annealing in the presence of a magnetic field. One suitable magnetic field strength is about 100 Gauss. A width range of magnetic field strengths are expected to be suitable for various applications and various target magnetic densities. For example, a common suitable range may be 30 Gauss to 500 Gauss. A suitable annealing temperature is in a range from about 255 to 275° C. in a semi-vacuum oven at a nitrogen purge of 4.5 to 7 Torr pressure. A suitable annealing duration is about 4 hours. Other annealing temperatures, annealing durations, and magnetic field strengths may be suitable. In one example, annealing raising magnetization of the FeTaN coating 426 from nearly zero to a range of 14 to 16 Kgauss. In the example, the FeTaN coating 426 has a suitable low corrosivity for an anisotropic film with a minimum hard axis corrosivity of about 0.16 and a maximum easy axis corrosivity of about 0.25.

Referring to FIG. 4H, the FeTaN coating 426 is patterned and etched to form a FeTaN first pole 428. A photoresist mask 434 is patterned and etched so that the FeTaN first pole 428 overlies only a first 430 of the side poles 412, extending laterally past the first 430 side pole on a first side, and extending between the first 430 and second 432 of the side poles on a second side. Portions of the FeTaN coating 426 that are not protected by the etched photoresist mask 434 are removed, for example by ion milling. Following the ion milling operation, the photoresist mask 434 is removed by strip clean, leaving the FeTaN first pole 428.

Referring to FIG. 4I, a photoresist mask layer 436 is patterned and etched to cover the entire read-write thin-film magnetic head 400 except for a portion overlying the FeTaN first pole 428 and extending a gap width on both sides 440 and 442 of the FeTaN first pole 428. The gap widths lateral to the FeTaN first pole 428 may be any suitable size, based on desired gap width for a read head and a write head. Typically, the read gap and the write gap have different widths, although in some cases the read gap and write gap width may be the same. An insulating gap layer 438 is formed overlying the photoresist mask layer 436, overlying the FeTaN first pole 428, and into the gap areas on both sides of the FeTaN first pole 428. The insulating gap layer 438 extends over a portion of the alumina frame 422 only a short gap width so that the insulating gap layer 438 does not touch either of the side poles 412. In one example, the insulating gap layer 438, is an alumina layer. Other suitable insulating gap materials, such as silicon oxide or dioxide may be used.

Referring to FIG. 4J, the photoresist mask layer 436 is lifted-off using a photoresist lift-off procedure, leaving the insulating gap layer 438 overlying the FeTaN first pole 428 and within both gap regions 440 and 442. A suitable lift-off procedure involves applying acetone to remove the photoresist mask layer 436.

A nickel-iron second top pole 444 is formed, also using a photoresist lift-off procedure. Referring to FIG. 4K, a NiFe seed layer 446 is formed extending across the surface of the read-write thin-film magnetic head 400. The NiFe seed layer 446 overlies the insulating gap layer 438 over the FeTaN first pole 428, and overlies the alumina frame 422. The NiFe seed layer 446 is an adhesive layer for attaching a second pole. The NiFe seed layer 446 is formed sufficiently thick to bond a NiFe coating but sufficiently thin that the magnetic density is not significantly affected. In one example, the NiFe seed layer 446 has a thickness in a range from about 800 Å to approximately 1200 Å. A photoresist layer 448 is deposited, patterned, and etched to cover most of the read-write thin-film magnetic head 400 but leaving a portion overlying the second side pole 432 uncovered. More specifically, a void in the photoresist layer 448 extends from a position overlying the FeTaN first pole 428 to a point that at least partially exposes the second side pole 432. Typically, the void extends completely across the second side pole 432 and may extend laterally to a position overlying the alumina frame 422. Nickel-iron is deposited into the void to a thickness approximately the same as or greater than the thickness of the FeTaN first pole 428 to form NiFe second top pole 444, magnetically contacting the second side pole 432.

Referring to FIG. 4L, the photoresist mask layer 448 is lifted-off using the photoresist lift-off procedure, leaving the NiFe second top pole 444 and the FeTaN first pole 428 overlying the read-write thin-film magnetic head 400. A suitable lift-off procedure involves applying acetone to remove the photoresist mask layer 448 in a strip and clean operation. The FeTaN first pole 428 is separated and electrically isolated from the NiFe second top pole 444 by the insulating gap layer 438 and the NiFe seed layer 446. The NiFe seed layer 446 extends lateral to the FeTaN first pole 428 and the NiFe second top pole 444 to cover the read-write thin-film magnetic head 400 overlying the alumina frame 422. The NiFe second top pole 444, the NiFe seed layer 446, and the second side pole 432 form a contiguous magnetic structure.

Referring to FIG. 4M, the surface of the read-write thin-film magnetic head 400 is polished using chemical-mechanical polishing (CMP) to remove excess NiFe plating and planarize the surface of the NiFe second top pole 444 to a level even with the FeTaN first pole 428. The CMP operation is optional since operation of the head with a moving magnetic media immediately wears the NiFe second top pole 444 to a planar surface. The NiFe seed layer 446 overlying the read-write thin-film magnetic head 400 lateral to the FeTaN first pole 428 and the NiFe second top pole 444 is removed, for example by sputter etching.

The FeTaN first pole 428 and the NiFe second top pole 444 are formed from different materials and have distinct magnetic characteristics. In an illustrative example, FeTaN first pole 428 has a magnetization density in a range from 1200 to 1600 Gauss and the NiFe second top pole 444 has a magnetic density in a range from 8000 to 12000 Gauss.

Referring to FIG. 4N, an extended view of the read-write thin-film magnetic head 400 illustrates contact vias 449 that are positioned lateral to the magnetic yoke 402 and alumina frame 422. The contact vias 449 may have become exposed during stair step etching and CMC contouring. An insulating layer 450 is formed overlying the FeTaN first pole 428, the NiFe second top pole 444, and extending over the alumina frame 422. The insulating layer 450 has a suitable thickness for electrically and magnetically insulating the read-write thin-film magnetic head 400 from the electrical contact vias 449. A suitable material for the insulating layer 450 is alumina, although other insulating materials may otherwise be used. A suitable insulating thickness of an alumina insulating layer 450 is about $1\mu$, although other thicknesses may also be suitable. A chrome-copper seed layer 452 is formed overlying the insulating layer 450 to serve as a base for deposition of a FeTaN wear layer 454. In one example, the chrome-copper seed layer 452 has a base chrome layer with a thickness of about 200 Å, upon which a copper layer with a thickness from about 1200 Å to 1700 Å is formed. The chrome layer and copper layer are generally plated onto the surface of the insulating layer 450. The FeTaN wear layer 454 is plated onto the chrome-copper seed layer 452 to a thickness that is generally $2\mu$ to $3\mu$ greater than the throat height. Accordingly, a suitable thickness of the FeTaN wear layer 454 is in a range from about $3.5\mu$ to approximately $10\mu$. A suitable corrosivity for the FeTaN wear layer 454 is about 5 Orstad.

The FeTaN wear layer 454 can be constructed as either a magnetic wear layer or a nonmagnetic wear layer. For a nonmagnetic wear layer, the FeTaN wear layer 454 is formed in a nonmagnetic state and thermal annealing to magnetize the wear layer is omitted. Although other fabrication operations for forming the FeTaN wear layer 454 are known by one having ordinary skill in the art, one example utilizes FeTaN deposition in which 10 to 14% tantalum is applied to the head with the remainder iron. The deposition takes place in an argon gas ambient with 20–30% nitrogen added, by volume. Power density applied during deposition ranges from about 2.5 Kwatt to 3.5 Kwatt, and a substrate bias voltage in a range from about 25–35 V at 12–18 mTorr gas pressure. A suitable cooling temperature range is from 4 to 10° C. The described fabrication parameters are presented for example only and not limitation. Any suitable nonmagnetic FeTaN deposition parameters may be used.

For a magnetic wear layer, the FeTaN layer is made magnetic by thermal annealing in the presence of a magnetic field. One suitable magnetic field strength is about 100 Gauss. A suitable annealing temperature is in a range from about 255 to 275° C. in a semi-vacuum oven at a nitrogen purge of 4.5 to 7 T pressure. A suitable annealing duration is about 4 hours. Other annealing temperatures, annealing durations, and magnetic field strengths may be suitable. In one example, annealing raising magnetization of the FeTaN wear layer 454 from nearly zero to a range of 14 to 16 Kgauss. In the example, the FeTaN wear layer 454 has a suitable low corrosivity for an anisotropic film with a minimum hard axis corrosivity of about 0.16 and a maximum easy axis corrosivity of about 0.25.

Iron tantalum nitride is a suitable material for either a magnetically-conductive or nonmagnetic FeTaN wear layer 454, including the hard, wear-resistant gap layer 460, not only for the controllable magnetic properties of FeTaN but also to exploit the durability and hardness of the material. The FeTaN wear layer 454 is advantageously used as a wear material in the media contact region of the read-write thin-film magnetic head 400.

FeTaN has a hardness that is greater than the hardness of NiFe, but less than the hardness of DLC. A typically range of Knoop hardness for FeTaN is from about 600 to 900 Knoop. Although the hardness of FeTaN is less than the hardness of DLC, FeTaN has been found more durable than DLC in humid operating conditions.

Iron tantalum nitride is formed on the substrate wafer by a sputtering technique including a nitrogen doping gas process for hardening of the deposited film. Hardening advantageously increases wear resistance and increases fatigue life.

In various embodiments, FeTaN is sputtered using a suitable sputtering method including, for example, direct-current diode, RF diode, triode, and magnetron sputtering. Sputtering is a physical process, rather than chemical process, for forming thin coatings that takes place in a vacuum. Sputtering is also termed physical vapor deposition (PVD). Following a pretreatment procedure of mechanical and chemical cleaning of a substrate wafer, the substrate wafer and a target of a selected film material are placed within a vacuum chamber. The vacuum chamber for sputtering is typically operated at a vacuum pressure in a range from about $10^{-6}$ torr to $10^{-9}$ torr. Sputtering temperatures typically range from about 25° C. to approximately 500° C. The target is electrically energized with a negative D.C. potential or radio frequency voltage such as 600V. Other voltages in a suitable range may be applied. A controlled flow of high-energy particles of a heavy inert gas, for example argon ions, is introduced into the vacuum chamber and ionized to a positive charge. The positively charged argon atoms are attracted to the grounded target and accelerate towards the target, gaining momentum so that, upon impact with the target, momentum is transferred, causing target material atoms to scatter into a plasma in the vacuum chamber with a kinetic energy of several electron volts. Dislodged coating material is ejected primarily in atomic form from the target. The substrate is positioned before the target to intercept a flux of sputtered atoms. Some target atoms come to rest on the substrate wafer in a physical deposition process that includes no chemical or compositional change. Sputtering forms a deposit having a thickness in a range from about 0.02 $\mu$m to approximately 10 $\mu$m.

The sputtering process advantageously allows for good control of film characteristics through balancing of sputtering parameters including pressure, deposition rate, and target material. For example, mixtures of material are sputtered in one process through usage of multiple target arrangements. While sputtering produces good anisotropic etching, disadvantages of sputtering include poor selectivity, high surface damage, and low etch rates.

The magnetically conductive, hard and wear resistant material advantageously acts to prevent external magnetic fields from migrating into the gap and affecting fields of the gap. External magnetic fields are most problematic when the magnetic head performs a read operation.

Referring to FIG. 4O, the surface of the FeTaN wear layer 454 is etched. Overlying the FeTaN first pole 428 and the NiFe second top pole 444, the surface is etched through the chrome-copper seed layer 452 and insulating layer 450 so that the FeTaN first pole 428 and NiFe second top pole 444 are exposed. One suitable etching technique is a tape lap operation that etches through the FeTaN wear layer 454 using a diamond tape. Other suitable etching techniques that are known by those having ordinary skill in the art may be used. An additional etching procedure is used to etch between the read head and write head. A suitable etching technique is ion milling or wet etching.

In practice thousands of multiple-gap thin film magnetic heads 400 are fabricated on a common die or substrate. At the completion of the fabrication process, the substrate is diced up into individual heads. In an illustrative embodiment, the dimensions of the substrate of multiple-gap thin film magnetic head 400 after dicing is approximately 0.5 mm by approximately 1 mm.

Referring to FIGS. 5A(*i*), 5A(*ii*), and 5A(*iii*), one example of a fabrication procedure is depicted in which an etched contact surface 510 has a central elevated region 512 that is approximately 6 mm deep and about 3 mm wide. Lateral to the central elevated region are a plurality of sequential steps 514 with all steps having a substantially uniform vertical sidewall, a relatively uniform width of about 1 mm, and a relatively uniform height of about 1 $\mu$m. Viewed from the top looking down, the contact surface 510 has the form of a rounded rectangle so that steps 516 most distal to the central elevated region 512 are gradually shortened and have gradually curved edges.

In FIGS. 5A(*i–iii*), 5B(*i–iii*), and 5C(*i–iii*), the stair-step profile is formed by ion milling the sample. However, in other embodiments the stair-step structure is formed using any suitable technique for removing selected portions of the elevated substrate. For example, etching processes such as wet-etching, dry-etching, plasma etching, ion milling, and the like are typically used to sculpt the substrate into a predetermined shape. In many embodiments, the shape of the media contact surface is advantageously selected to optimize the surface area of contact to the media.

The substrate is formed into a stair-step structure by etching. According to one processing technique, the stair-step structure is formed by ion milling the workpiece. Ion milling is also termed ion mill processing, ion beam milling, ion beam etching, sputter etching, and reverse sputter. Although ion milling is used to etch an alumina substrate in the illustrative embodiment, in other embodiments other substrates may be employed. Other substrate materials include silicon, silicon dioxide, silicon nitride, gallium arsenide, polyimide, photoresist, aluminum, tungsten, molybdenum, and titanium, all of which may be etched using ion milling by plasma or reactive ion etching. Etching is selectively performed using different types of chambers and reactors, various electrode configurations, pressures, and frequencies, and using a diversity of etchant gases. Aluminum is typically etched using gases including $BCl_3$, $BCl_3/Cl_2$, $CCl_4/Cl_2/BCl_3$, and $SiCl_4/Cl_2$. Tantalum is typically etched using gases including $CF_4/O_2$, $SF_6/O_2$, and $NF_3/H_2$.

Ion milling is a dry etching method using an ion beam to generate an etching action. Ion Milling is a physical process in which a substrate wafer is placed on a holder in a vacuum chamber and a heavy inert gas such as argon is introduced into the vacuum chamber. Electrodes including an anode and a cathode are contained within the vacuum chamber and generate a stream of high-energy electrons that ionize the argon atoms to a high-energy state with a positive charge. The wafer is held on a negatively charged grounded holder that attracts the ionized argon atoms. The attraction accelerates the argon atoms toward the wafer, increasing the energy of the argon atoms. The argon atoms impact the wafer surface, blasting small chips of the wafer from the surface in a "momentum transfer" physical process that includes no chemical reaction.

Ion milling etches the substrate in a highly directional or anisotropic manner resulting in good definition of small openings. Ion milling, like other physical processes, has poor selectivity and creates some radiation damage.

In an alternative process technique, reactive ion etching (RIE) combines plasma etching and ion beam etching principles to perform ion milling. RIE techniques attain the selectivity advantages of chemical plasma etching in combination with the directional advantages of physical ion milling. For example, reactions that take place at the surface of the substrate wafer exposed to the plasma can be affected by ultraviolet photons and soft X rays that are present in the plasma and sufficiently energetic to break chemical bonds.

Electron and ion bombardments effectively change and promote chemical reactions in the substrate by momentum transfer and enhanced diffusion.

A sputtering etch process differs from a sputtering deposition in that, in the etch process, formed product species are volatile and desorb so that the substrate wafer is etched. In contrast, if the reaction products are nonvolatile, a layer of reaction products deposit on the substrate wafer.

Figure 5B:
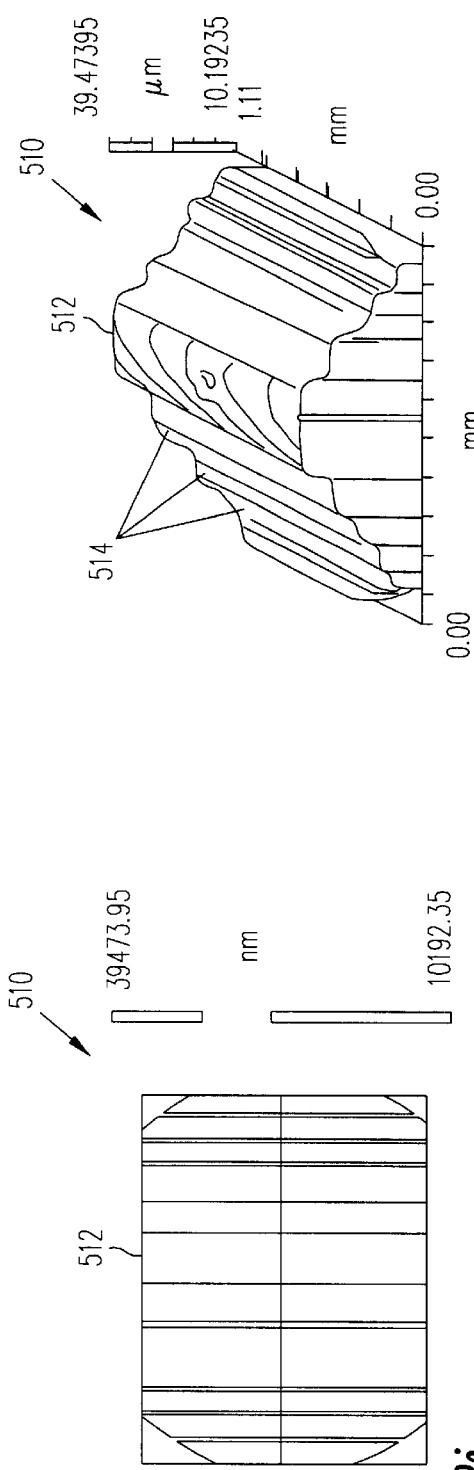
FIGS. 5A(*i*–*iii*), 5B(*i*–*iii*), and 5C(*i*–*iii*) are various types of plots including filled plots (i), oblique plots (ii), and profile plots (iii) that show the structure of a contact surface of a thin film head at sequential stages of chemical-mechanical contouring (CMC) processing for a sample that is stair-step etched using an ion mill procedure.
Figure 5B:
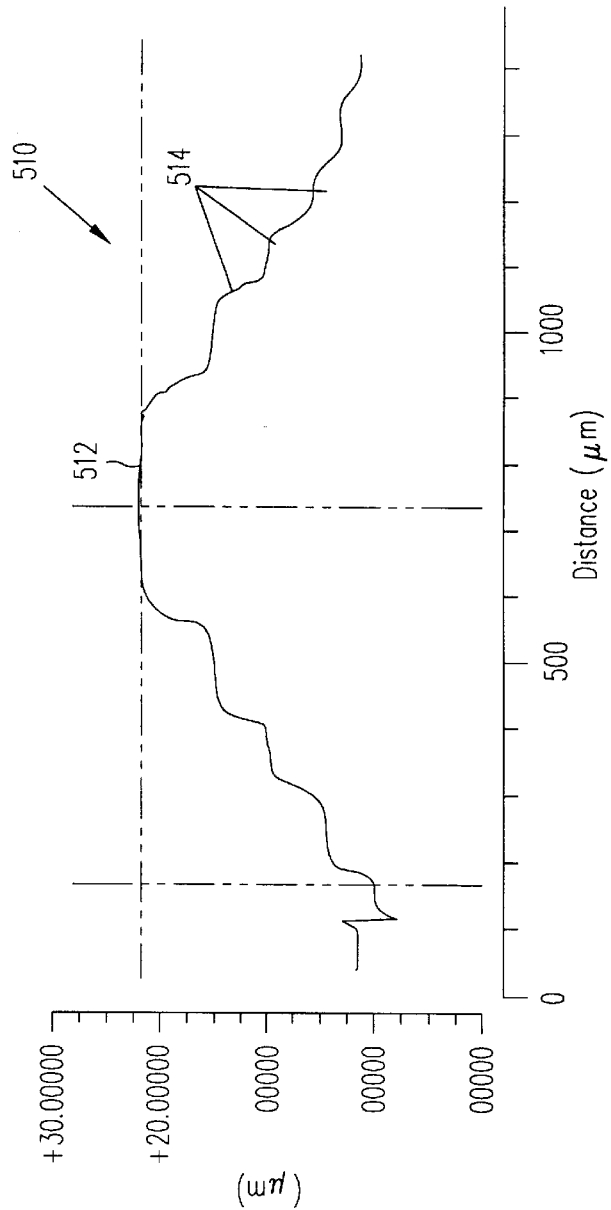

Once the stair-step structure is formed, chemical-mechanical contouring (CMC) is performed to smooth the sharp edges of the stair-step structure. FIGS. 5B(*i*), 5B(*ii*), and 5B(*iii*) respectively show a filled plot, an oblique plot, and a profile plot of the structure of the contact surface 510 of the thin film head following chemical-mechanical polishing (CMP) to partially smooth the edges of the stair-steps of the contact surface 510. More specifically, the structure of the contact surface 510 is shown following approximately 2 minutes of chemical-mechanical polishing so that edges of the steps 514 are rounded including protruding edges at the top of a step 514 and inverted edges at the base of a step 514.

Chemical mechanical contouring is performed on the stair-step structure by polishing by applying a polishing pad in a typically orbital or planetary motion to a stationary thin film substrate. The orbital or planetary motion is applied to the thin film substrate by a lapping surface of the polishing pad to planarize a plurality of structures on a substrate, typically as an intermediate step in thin film processing so that, as layers of a thin film magnetic head structure are deposited and etched, successive layers are selectively planarized. The planarization of intermediate layers is performed to ready the thin film surface for subsequent layer depositions.

CMC processing further involves application of a chemical slurry to the polishing pad and the thin film substrate workpiece to generate a chemical etching while the workpiece is mechanically contoured. The slurry is a mixture of a chemical etchant and an abrasive compound. As the slurry and polishing motion of the polishing pad are applied to the thin film substrate workpiece, the workpiece is lapped by a lapping surface of the polishing pad.

Figure 5C:
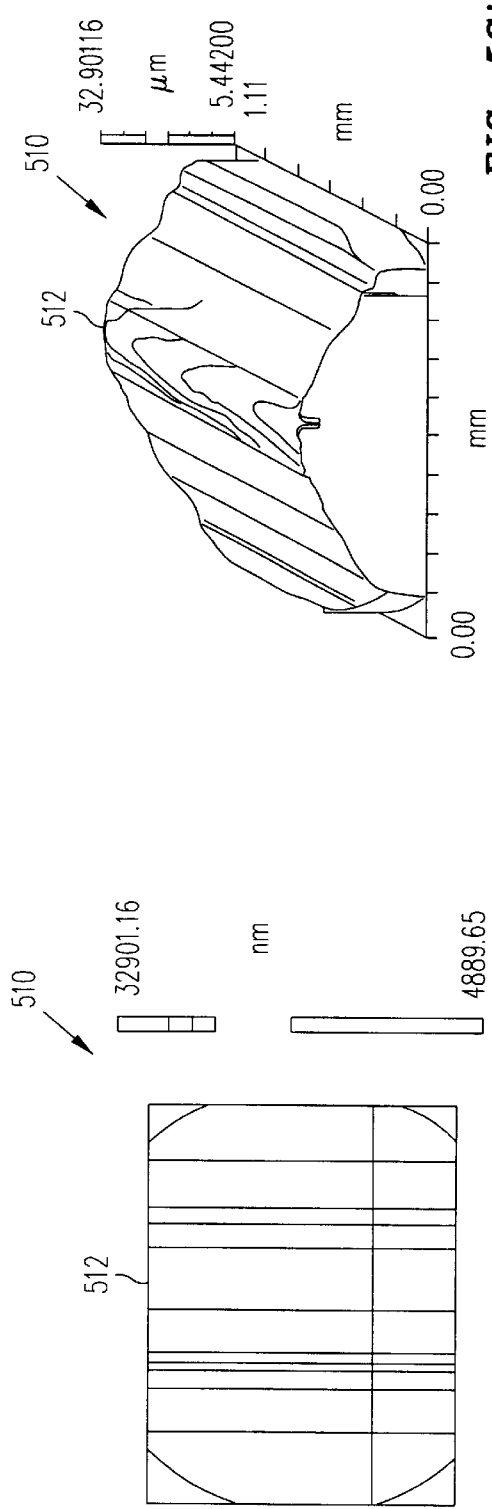
Figure 5C:
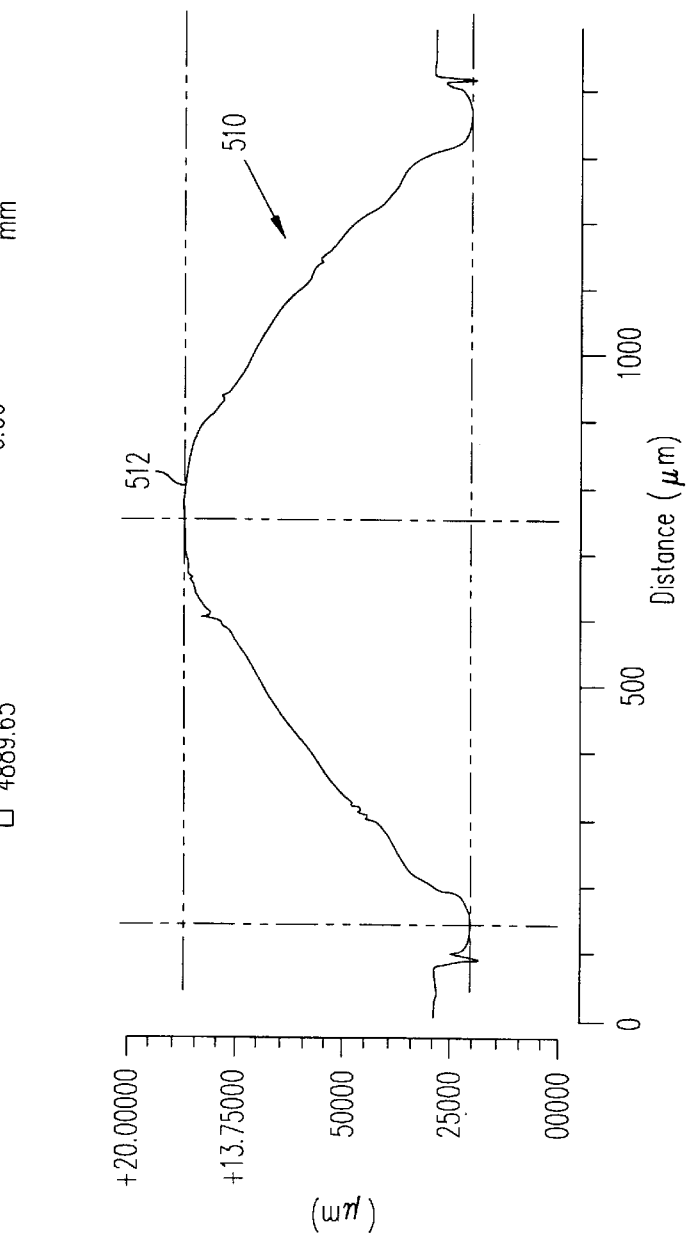

Chemical-mechanical contouring (CMC) is performed for a sufficient time to completely smooth the sharp edges of the stair-step structure so that the entire surface of the contact surface 510 is substantially uniformly smooth with essentially no local variation in curvature. FIGS. 5C(*i*), 5C(*ii*), and 5C(*iii*) respectively show a filled plot, an oblique plot, and a profile plot of the structure of the contact surface 510 of the thin film head following chemical-mechanical polishing (CMP) to fully smooth the edges of the stair-steps of the contact surface 510. More specifically, the structure of the contact surface 510 is shown following approximately 16 minutes of chemical-mechanical polishing so that edges of the steps 514 are highly rounded with only minimal protruding edges at the top of a step 514 and minimal inverted edges at the base of a step 514. Continued CMP further smoothes the contact surface 510 into a uniformly curved surface. The total height of the contact surface 510 is only minimally reduced by the chemical-mechanical contouring process.

Utilization of a stair-step etch in combination with chemical-mechanical contouring advantageously provides control of the radius of curvature of the contoured surface. Conventional photolithography techniques are utilized in multiple steps to form a mask layer overlying the substrate and device. The dimensions of the mask in each of the multiple masking steps and the amount of etching for each step determines the shape of the stair-step structure and thus the radius of curvature of the contoured surface that results from the chemical-mechanical contouring operation.

Accordingly, the chemical-mechanical contouring using a stair-step etch is a highly flexible and controllable technique for forming contoured surfaces with various selected sizes, shapes, and contours. A multiplicity of samples having identical understructures including like-sized substrate wafers and the same fabricated device or selection of multiple fabricated devices may be controllably processed to form a variety of different contoured surface structures simply by changing mask sizes and etch parameters. Mask sizes, masking sequences, and etch parameters are controlled to select the geometric parameters of a contoured bump including a selection of bump height, radius of curvature, slope, breadth, and the like. The radius of curvature may be selected so that a curved surface is formed in a single dimension or two dimensions. The slope of the contoured surface may be constant in one or two dimensions or varied in the one or two dimensions. The subtractive nature of the etching process is advantageous for facilitating customization of the media contact surface of a magnetic transducer.

The process of chemical-mechanical contouring (CMC) using a stair-step etch has several inherent advantages. One advantage is that a single head structure may be flexibly used for multiple magnetic transducer applications with the various applications being particularly tailored to a selected media contact form. One aspect of this advantage is that a large number of samples having the single head structure may be fabricated and stocked for various applications. When a customer orders samples that are suited for a particular application, one or more elevated layers of substrate are deposited and etched overlying the head structure with the type of substrate, the number and thickness of the layers, the number of masking and etching steps, the form of the masks, and the etching parameters selected to attain a media surface that matches the customer order.

Another aspect of the advantage is that a variety of media contact surface contours are practicable by controlling the processing of a single material, the elevated substrate material. In contrast, the contour geometry of conventional magnetic transducers is controlled by selecting dimensions of multiple constituent structures within the transducers including, for example, magnetic yoke structures formed from NiFe, insulating layer structures formed from dielectric materials, and protective materials formed from hard materials.

Figure 6A:
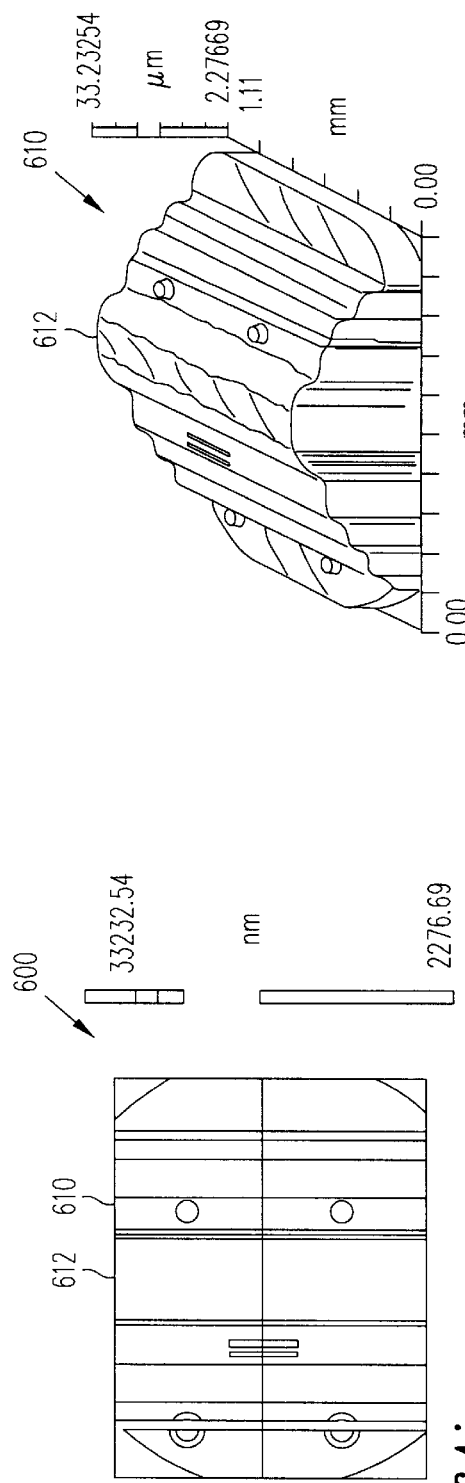
FIGS. 6A(*i*–*iii*), 6B(*i*–*iii*), and 6C(*i*–*iii*) are various types of plots including filled plots (i), oblique plots (ii), and profile plots (iii) that show the structure of a contact surface of a thin film head at sequential stages of chemical-mechanical contouring (CMC) processing for a sample that is stair-step etched using a wet-etch procedure.
Figure 6A:
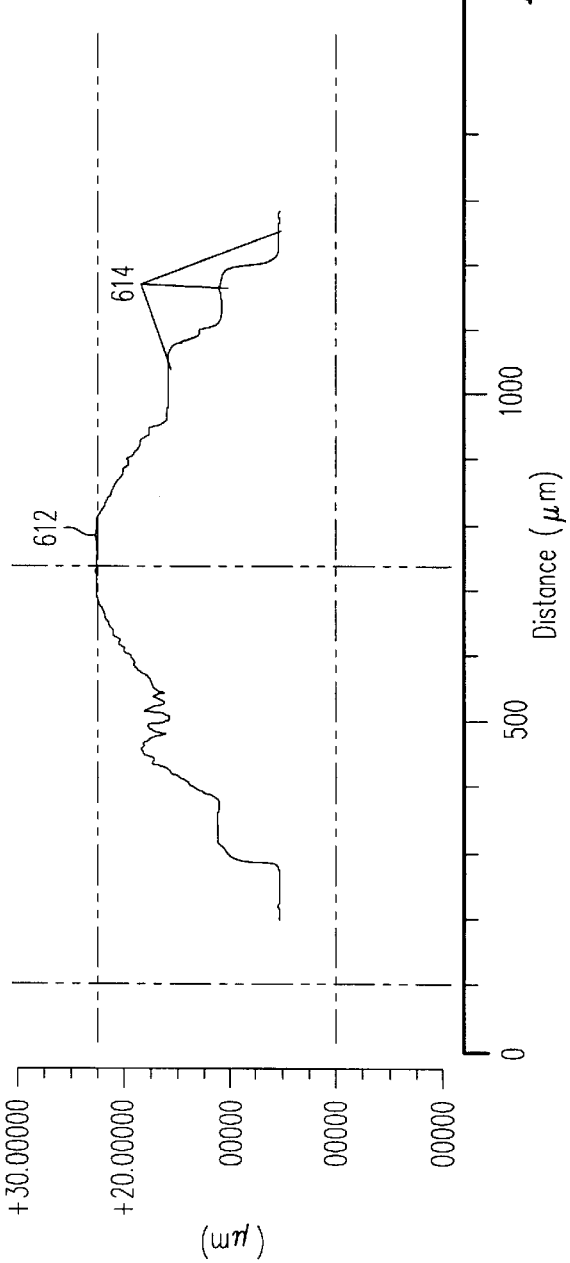

FIGS. 6A(*i–iii*), 6B(*i–iii*), and 6C(*i–iii*) show sequential stages of chemical-mechanical contouring (CMC) processing for a sample that is stair-step etched using a wet etch procedure. Various types of plots include filled plots (i), oblique plots (ii), and profile plots (iii) that show the structure of a contact surface 600 of a thin film head. The process of chemical-mechanical contouring (CMC) using a stair-step wet etch includes forming of an elevated layer of substrate overlying a device and etching of the elevated layer to a stair-step structure with the height and width of the stair-steps selected to attain a predetermined shape and size.

FIGS. 6A(*i*), 6A(*ii*), and 6A(*iii*) respectively show a filled plot, an oblique plot, and a profile plot of the structure of the contact surface 600 following stair-step etching of the substrate 510 using wet etching. The etched contact surface 610 has a central elevated region 612 that is approximately 6 mm deep and about 2.5 mm wide. A stair-step structure using wet etching generally has sides of the central elevated region 612 that are relatively slanted in comparison to the highly vertical sidewalls of central elevated region 512 formed by ion milling. Lateral to the central elevated region 612 are a plurality of sequential steps 614 with the steps having a sidewall that is generally slanted in the center of the contact surface 610 and more vertical extending laterally from the center. In addition, the steps 614 have a step height that gradually decreases from the center to the periphery of the contact surface 610. Thus, the stair-step structure of the contact surface 610 formed by wet etching is less uniform across the structure in comparison to the contact surface 510 formed by ion milling.

In the illustrative embodiment, alumina is etched by immersion using wet etchants. A wafer is immersed in a tank containing etchant for a specified time, transferred to a rinse station for acid removal, and transferred to a station for a final rinse and dry step. Wet etching typically does not attain sufficient control and precision for products having feature sizes of less than about 3 µm. Heaters and agitation devices such as stirrers and ultrasonic or megasonic wave generators are applied to the immersion tank to enhance etching uniformity and process control.

Aluminum and aluminum alloys are selectively etched using wet etchants based on phosphoric acid. Unfortunately, the reaction of aluminum and phosphoric acid generates bubbles of hydrogen as a by-product. The bubbles attach to the substrate and block etching action, resulting in aluminum spots on the wafer surface or bridges of aluminum that possibly cause a short-circuit between adjacent leads. An etching solution containing a mixture of phosphoric acid, nitric acid, acetic acid, water, and wetting agents, in combination with wafer agitation, reduces problems caused by the bubbles.

Chemical etching is usually isotropic and characterized by high etch rates, usually good etch selectivity, and low substrate damage. However, the usage of ion milling is considered advantageous over wet etching of alumina on the basis of an ability to achieve good control over processes to obtain a suitable shape of the etched region. Photoresist materials that are used to delineate etched patterns often lose adhesion in wet etchant solutions, thereby altering pattern dimensions and preventing control of line widths. In addition, ion milling avoids problems associated with the disposal of chemicals used in wet etching techniques.

Although a wet etching procedure produces a stair-step structure that is less uniform than the structure formed using ion milling, wet etching advantageously etches the contact surface more rapidly, typically in a range of tens of minutes or less while ion milling performs etching for a time on the order of hours.

Figure 6B:
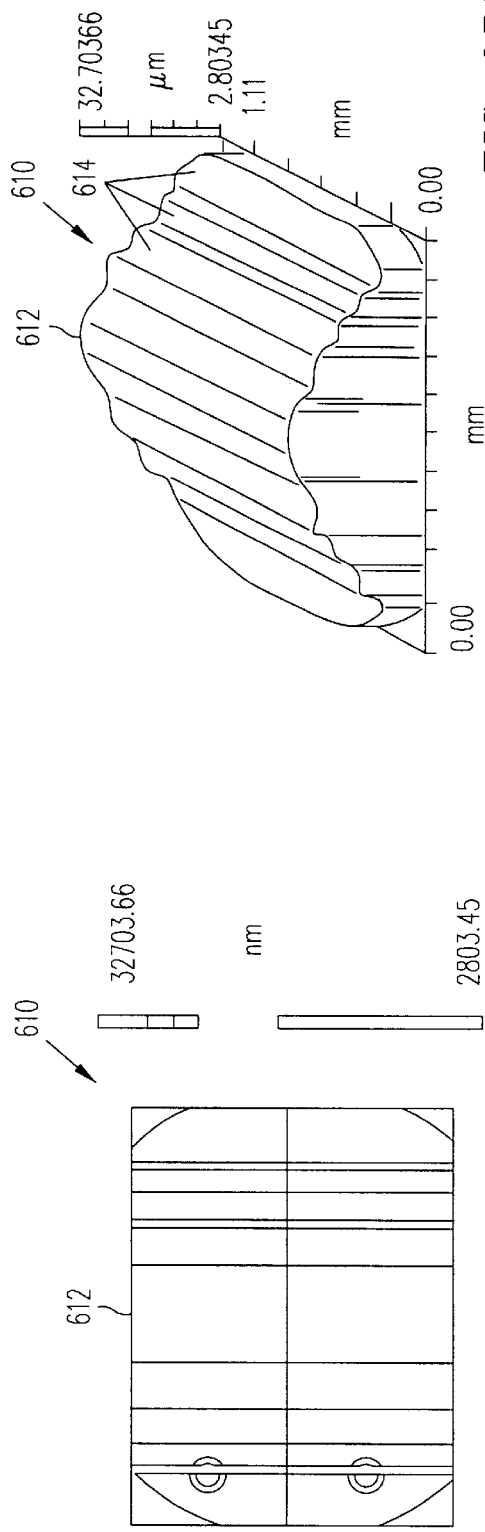
Figure 6B:
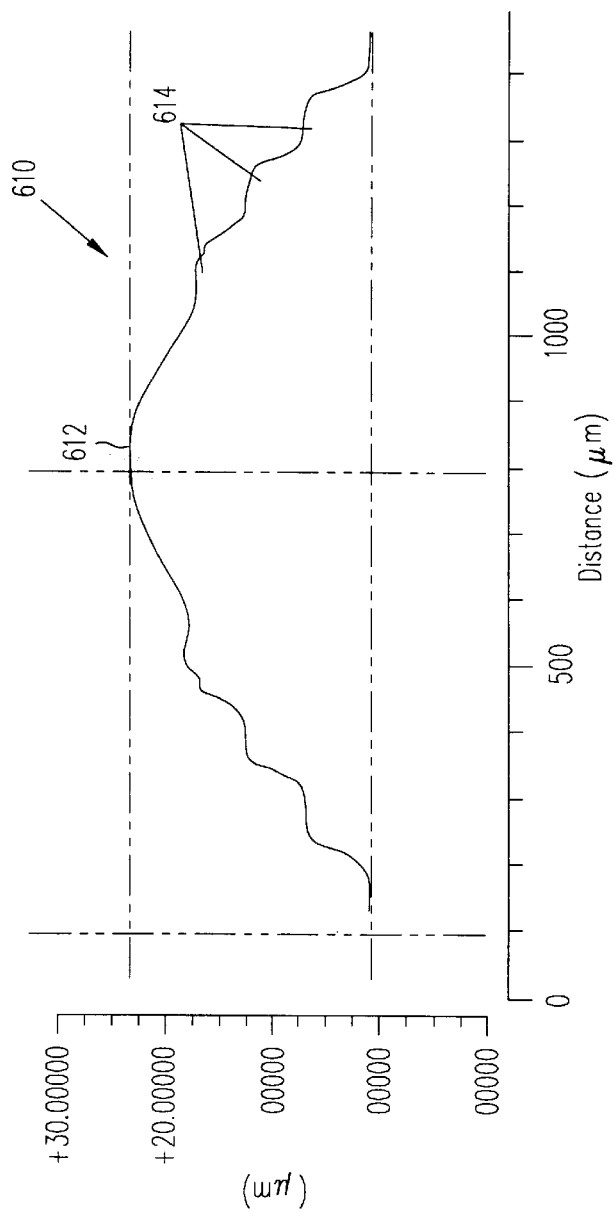

Once the stair-step structure is formed, chemical-mechanical contouring (CMC) is performed to smooth the sharp edges of the stair-step structure. FIGS. 6B(*i*), 6B(*ii*), and 6B(*iii*) respectively show a filled plot, an oblique plot, and a profile plot of the structure of the contact surface 610 of the thin film head following chemical-mechanical polishing (CMP) to partially smooth the edges of the stair-steps of the contact surface 510. More specifically, the structure of the contact surface 510 is shown following approximately 2 minutes of chemical-mechanical polishing so that edges of the steps 514 are rounded including protruding edges at the top of a step 514 and inverted edges at the base of a step 514.

The stair-step etch procedure can be used to contour a large variety of materials with etching procedures and etchants selected according to the material that is etched. Persons with ordinary skill in the thin-film fabrication arts can readily select suitable etchants and etching techniques to etch particular materials. In addition to common aluminum oxide and silicon dioxide thin-film materials, the procedure and variations of the procedure can be used to contour other materials including photoresist, NiFe, NiP, FeTaN, diamond-like carbon (DLC)

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A thin film processing method comprising:
    fabricating a finished thin film substrate including a plurality of magnetic thin-film head devices, the magnetic thin-film head devices having a head structure that is raised relative to a planar surface of the thin film substrate;
    stair-step etching the head structure so that the individual thin-film head devices have the form of raised bumps with a plurality of stair-step edges; and
    chemical mechanical contouring (CMC) the thin film substrate subsequent to the fabrication step to smooth the stair-step edges of the raised bumps to form substantially smooth, curved surfaces.

2. A method according to claim 1 further comprising:
    stair-step etching the head structure by locating a central point of a device on the head structure surface, etching a sequence of stair-steps surrounding the central point, and controlling the width and depth of the stair-step etches as a function of distance from the central point.

3. A method according to claim 1 further comprising:
    locating central points on a surface overlying the individual thin-film head devices; and
    controlling step width, depth, and number in the stair-step etching operation to variably set a radius of curvature of the bumps.

4. A method according to claim 1 further comprising:
    stair-step etching the head structure so that the individual thin-film head devices have the form of raised bumps with a structure selected from among a plurality of structures including circularly symmetric, elliptically symmetric, square, rectangular, polygonal, and asymmetric structures.

5. A method according to claim 1 further comprising:
    stair-step etching the head structure using an ion milling procedure.

6. A method according to claim 1 further comprising:
    stair-step etching the head structure using a wet etch procedure.

7. A thin film processing method comprising:
    fabricating a finished thin film substrate including a plurality of thin film magnetic heads, the magnetic thin-film heads being raised relative to a planar surface of the thin film substrate, the raised thin-film heads including a magnetic yoke, a coil encircling the magnetic yoke, magnetic poles coupled at polar ends of the magnetic yoke, the magnetic poles being separated by a gap, and an insulating frame encasing and mutually insulating the magnetic yoke and the coil, the magnetic yoke and coil being centrally-located within an individual thin-film head;

stair-step etching the insulating frame of the individual thin-film heads so that the centrally-located magnetic yoke and coil underlie a raised portion of the insulating frame and portions of the individual thin-film heads lateral to the magnetic yoke and coil are etched to form depressions between the individual thin-film heads; and chemical mechanical contouring (CMC) the thin film substrate subsequent to the fabrication step to form a substantially smooth, curved surface overlying the individual thin film magnetic heads.

8. A method according to claim 7 further comprising:

stair-step etching the insulating frame by locating a central point of an individual thin-film head, etching a sequence of stair-steps surrounding the central point, and controlling the width and depth of the stair-step etches as a function of distance from the central point.

9. A method according to claim 7 further comprising:

locating central points on a surface overlying the individual thin-film heads; and controlling step width, depth, and number in the stair-step etching operation to variably set a radius of curvature of the individual thin-film heads.

10. A method according to claim 7 further comprising:

stair-step etching the insulating frame so that the individual thin-film heads have the form of raised bumps with a structure selected from among a plurality of structures including circularly symmetric, elliptically symmetric, square, rectangular, polygonal, and asymmetric structures.

11. A method according to claim 7 further comprising:

stair-step etching the insulating frame using an ion milling procedure.

12. A method according to claim 7 further comprising:

stair-step etching the insulating frame using a wet etch procedure.

13. A method of forming a smooth surface on a thin-film structure comprising:

selecting a width and depth of stair-step etching;

stair-step etching the thin-film structure according to the selected width and depth; and chemical-mechanical contouring (CMC) the stair-step etched thin-film structure to smooth edges formed by the stair-step etching process, the height and width of the stair-steps selected to attain a predetermined shape and size of bumps formed on the thin-film structure surface.

* * * * *